(12) United States Patent
Chiba

(10) Patent No.: US 8,068,498 B2
(45) Date of Patent: Nov. 29, 2011

(54) COMPUTER READABLE RECORD MEDIUM ON WHICH DATA COMMUNICATION LOAD DISTRIBUTION CONTROL PROGRAM IS RECORDED AND DATA LOAD DISTRIBUTION CONTROL METHOD

(75) Inventor: Masahiro Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 11/231,467

(22) Filed: Sep. 21, 2005

(65) Prior Publication Data

US 2006/0013224 A1    Jan. 19, 2006

Related U.S. Application Data

(63) Continuation of application No. PCT/JP2003/004148, filed on Mar. 31, 2003.

(51) Int. Cl.
*H04W 4/00* (2009.01)
*H04L 12/28* (2006.01)
*H04J 3/24* (2006.01)
*H04J 3/04* (2006.01)
*G06F 9/46* (2006.01)

(52) U.S. Cl. .......... 370/395.41; 370/340; 370/389; 370/474; 370/536; 718/105

(58) Field of Classification Search .......... 370/398, 370/390, 327, 340, 341
See application file for complete search history.

(56) References Cited

U.S. PATENT DOCUMENTS

| | | | | |
|---|---|---|---|---|
| 5,608,733 A * | 3/1997 | Vallee et al. | | 370/394 |
| 5,617,417 A * | 4/1997 | Sathe et al. | | 370/394 |
| 6,016,310 A * | 1/2000 | Muller et al. | | 370/255 |
| 6,016,319 A * | 1/2000 | Kshirsagar et al. | | 370/410 |
| 6,046,979 A * | 4/2000 | Bauman | | 370/229 |
| 6,078,960 A * | 6/2000 | Ballard | | 709/229 |
| 6,151,297 A * | 11/2000 | Congdon et al. | | 370/216 |
| 6,490,632 B1 | 12/2002 | Vepa et al. | | 709/250 |
| 6,553,028 B1 * | 4/2003 | Tang et al. | | 370/389 |
| 6,560,630 B1 * | 5/2003 | Vepa et al. | | 718/105 |
| 6,874,147 B1 * | 3/2005 | Diamant | | 719/328 |
| 7,145,869 B1 * | 12/2006 | Kadambi et al. | | 370/229 |
| 7,290,059 B2 * | 10/2007 | Yadav | | 709/242 |
| 2003/0028644 A1 | 2/2003 | Maguire et al. | | 709/226 |
| 2003/0108052 A1 * | 6/2003 | Inoue et al. | | 370/399 |
| 2004/0151111 A1 * | 8/2004 | Yarroll et al. | | 370/216 |

FOREIGN PATENT DOCUMENTS

| | | |
|---|---|---|
| EP | 0 891 061 | 1/1999 |
| JP | 7-245619 | 9/1995 |
| JP | 11-074927 | 3/1999 |
| JP | 2001-292153 | 10/2001 |

* cited by examiner

*Primary Examiner* — Kevin C Harper
*Assistant Examiner* — Thinh D Tran
(74) *Attorney, Agent, or Firm* — Greer, Burns & Crain, Ltd.

(57) ABSTRACT

Highly flexible trunking is actualized by using a switching hub without a trunking function. A computer generates a distribution algorithm notification packet including physical addresses of communication interfaces and a distribution algorithm used for distributing data sent from a computer at the other end to the computer among the communication interfaces (step S1) and sends the distribution algorithm notification packet to the computer at the other end (step S2). The computer at the other end determines a communication interface which is a destination of send data to be sent to the computer in accordance with the distribution algorithm about which the computer at the other end was informed, designates a physical address of the determined communication interface as a destination, and sends the send data.

16 Claims, 21 Drawing Sheets

| SOURCE NODE NAME | DESTINATION NODE NAME | APPLICATION NAME | ALGORITHM USED | MAC ADDRESS |
|---|---|---|---|---|
| hostA | hostB | ftp | ROUND ROBIN | "a","b","c","d" |
| hostA | hostC | ftp | ROUND ROBIN | "a","b","c","d" |
| hostA | hostD | ftp | ROUND ROBIN | "a","b","c","d" |
| hostA | hostE | ftp | ROUND ROBIN | "a","b","c","d" |

FIG. 8

121 DISTRIBUTION ALGORITHM TABLE

| SOURCE NODE NAME | DESTI- NATION NODE NAME | APPLI- CATION NAME | ALGORITHM | SOURCE NIC | DESTI- NATION NIC | FLAG |
|---|---|---|---|---|---|---|
| hostA | hostB | ftp | ROUND ROBIN | a,b,c,d | x | VALID |
| | | telnet | FIXED NIC | a | x | VALID |
| | | appl-1 | TCP CONNECTION EQUAL DISTRIBUTION | a,b | x | INVALID |
| | | ... | ... | ... | ... | ... |
| hostA | hostC | ALL | ROUND ROBIN | a,b,c,d | x | VALID |
| ... | ... | ... | ... | ... | ... | ... |

FIG. 9

121a DISTRIBUTION ALGORITHM TABLE

| SOURCE NODE NAME | DESTINATION NODE NAME | APPLICATION NAME | ALGORITHM | SOURCE NIC (NAME OF COMPUTER ON WHICH NIC IS MOUNTED) | DESTINATION NIC | FLAG |
|---|---|---|---|---|---|---|
| hostA | hostB | ftp | ROUND ROBIN | a(n1),b(n1),c(n2),d(n2) | x | VALID |
| | | telnet | FIXED NIC | a(n1) | x | VALID |
| | | appl-1 | TCP CONNECTION EQUAL DISTRIBUTION | a(n1),b(n1) | x | INVALID |
| | | ... | ... | ... | ... | ... |
| hostA | hostC | ALL | ROUND ROBIN | a(n1),b(n1),c(n2),d(n2) | x | VALID |
| ... | ... | ... | ... | ... | ... | ... |

FIG. 14

COMPUTER READABLE RECORD MEDIUM ON WHICH DATA COMMUNICATION LOAD DISTRIBUTION CONTROL PROGRAM IS RECORDED AND DATA LOAD DISTRIBUTION CONTROL METHOD

CROSS-REFERENCE TO RELATED APPLICATIONS

This application is a continuing application, filed under 35 U.S.C. §111(a), of International Application PCT/JP2003/004148, filed Mar. 31, 2003.

BACKGROUND OF THE INVENTION (1) Field of the Invention

This invention relates to a computer readable record medium on which a data communication load distribution control program used for performing data communication via a multiplexed transmission line is recorded and a data load distribution control method and, more particularly, to a computer readable record medium on which a data communication load distribution control program using trunking is recorded and a data load distribution control method.

(2) Description of the Related Art

One method for expanding a band which can be used for communication between a plurality of units is trunking. In trunking, units are connected via a plurality of transmission lines. Each unit treats network interface cards (NICs) connected to the plurality of transmission lines as one logical LAN port. This expands a band used for transmission between units.

FIG. 21 shows an example of the configuration of a conventional trunking system. A conventional trunking system comprises a computer 910, a switching hub 920, and computers 930, 940, 950, and 960 at the other end.

The computer 910 includes an application 911, a trunking mechanism section 912, and NICs 913 through 916. The application 911 is a processing function for communicating with the computers 930, 940, 950, and 960 at the other end and performing various kinds of data processing. The trunking mechanism section 912 treats the NICs 913 through 916 as one LAN port and communicates with the switching hub 920. The trunking mechanism section 912 has configuration information 912a where the media access control (MAC) addresses of the NICs 913 through 916, an internet protocol (IP) address shared by the NICs 913 through 916, and the like are set.

The NICs 913 through 916 are connected to the switching hub 920 via different transmission lines and perform data communication with the switching hub 920.

Four of eight LAN ports on the switching hub 920 are connected to the NICs 913 through 916, respectively, on the computer 910. The other four LAN ports are connected to the computers 930, 940, 950, and 960, respectively, at the other end.

In addition, the switching hub 920 includes a trunking correspondence section 921. The trunking correspondence section 921 has configuration information 921a including information, such as the IP address of a machine connected to each LAN port.

In the system the configuration of which has been described above, trunking is performed between the computer 910 and the switching hub 920. That is to say, the computer 910 uses the multiplexed NICs 913 through 916 for forming one logical NIC. The computer 910 then sends and receives data via the logical NIC.

The switching hub 920 sends data sent from the computer 910 to the computer 930, 940, 950, or 960 at the other end. In addition, the trunking correspondence section 921 included in the switching hub 920 assigns data sent from the computer 930, 940, 950, or 960 at the other end to one of the LAN ports connected to the computer 910 and sends the data to the computer 910 via the LAN port.

This expands a band which can be used for data communication between the computer 910 and the switching hub 920.

It is possible to control load distribution among a plurality of LAN ports without the switching hub 920 including the trunking correspondence section 921. For example, a host computer with a plurality of local area network (LAN) adapters informs a computer at the other end about the physical address of any LAN adapter. The computer at the other end specifies the physical address about which the computer was informed and sends data to the host computer. As a result, data sent from a plurality of computers at the other end can be received with the load distributed among the plurality of LAN adapters (see, for example, Japanese Unexamined Patent Publication No. 07-245619 (FIG. 1)).

With the conventional system, however, basically both the computer and the switching hub must have a trunking function to connect them. As a result, cases where trunking can be used are limited. Moreover, the number of NICs used in the computer, the number of ports used on the switching hub, distribution algorithms used in the computer and the switching hub are set as information. In this case, the number of the NICs used in the computer must be the same as that of the ports used on the switching hub and the same distribution algorithm must be used in the computer and the switching hub. In addition, dedicated MAC addresses for performing trunking must be defined. Accordingly, setting work is trouble and a user is apt to make a mistake.

Furthermore, if the number of the NICs used is increased or decreased, communication must be stopped temporarily to change the above information set in the switching hub. As a result, changing the set information lowers the operating ratio of the system.

If a trunking function is actualized by using only a switching hub without a trunking function, an NIC to be used can be determined by, for example, exchanging IP address information and MAC address information between computers. However, exchanging only address information puts a limit on a distribution algorithm. For example, if the number of computers at the other end is one, then only a specific NIC is used and load distribution cannot be performed.

SUMMARY OF THE INVENTION

The present invention was made under the background circumstances described above. An object of the present invention is to provide a computer capable of performing highly flexible trunking with a switching hub not having a trunking function.

In order to solve the above problems, a computer readable record medium on which a data communication load distribution control program shown in FIG. 1 is recorded is provided in the present invention. A data communication load distribution control program recorded on a record medium according to the present invention actualizes the function of a data communication load distribution control section $1e$ for distributing a communication load on transmission lines for a computer on which communication interfaces $1a$, $1b$, $1c$, and 1d can be mounted. The computer 1 performs the following process on the basis of the data communication load distribution control program.

The computer 1 generates a distribution algorithm notification packet 4 including physical addresses of the communication interfaces 1a, 1b, 1c, and 1d and a distribution algorithm used for distributing data sent from a computer 3 at the other end to the computer 1 among the communication interfaces 1a, 1b, 1c, and 1d (step S1). The computer 1 then sends the distribution algorithm notification packet 4 to the computer 3 at the other end connected to the computer 1 via a network (step S2).

By doing so, the computer 1 can inform the computer 3 about the physical addresses of the communication interfaces 1a, 1b, 1c, and 1d mounted on the computer 1 and designate the load distribution algorithm.

Furthermore, in order to solve the above problems, a computer readable record medium on which a load distribution data sending program shown in FIG. 1 is recorded is provided. The load distribution data sending program recorded on the record medium according to the present invention actualizes the function of a load distribution data sending section 3b for distributing a communication load on transmission lines to the computer 1 at the other end on which the communication interfaces 1a, 1b, 1c, and 1d can be mounted. The computer 3 performs the following process on the basis of the load distribution data sending program.

When the computer 3 receives the distribution algorithm notification packet 4 including the physical addresses of the communication interfaces 1a, 1b, 1c, and 1d and the distribution algorithm used for distributing data sent to the computer 1 among the communication interfaces 1a, 1b, 1c, and 1d, the computer 3 stores the physical addresses of the communication interfaces 1a, 1b, 1c, and 1d and the distribution algorithm in a data table 3c. The computer 3 then determines a communication interface which is a destination of send data 5 to be sent to the computer 1 at the other end in accordance with the distribution algorithm. In addition, the computer 3 designates the physical address of the determined communication interface as a destination and sends the send data 5.

By doing so, the send data 5 is sent from the computer 3 to the computer 1 at the other end via the transmission lines on which the communication interfaces 1a, 1b, 1c, and 1d are located respectively in accordance with the distribution algorithm designated in the distribution algorithm notification packet 4, and the load on the transmission lines is distributed.

Moreover, in order to solve the above problems, a data communication load distribution control method for distributing a communication load on transmission lines for a computer on which a plurality of communication interfaces can be mounted, comprising the steps of generating a distribution algorithm notification packet including physical addresses of the plurality of communication interfaces and a distribution algorithm used for distributing data sent from a computer at the other end to the computer among the plurality of communication interfaces; and sending the distribution algorithm notification packet to the computer at the other end connected to the computer via a network is provided.

By using this data communication load distribution control method, the computer can inform the computer at the other end about the physical addresses of the plurality of communication interfaces mounted on the computer and designate the load distribution algorithm.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 shows an example of the contents of a data section included in a distribution algorithm notification packet.

FIG. 9 shows an example of the data structure of a distribution algorithm table on a server computer.

FIG. 14 shows an example of the data structure of a distribution algorithm table used in the system according to the second embodiment of the present invention.

DESCRIPTION OF THE PREFERRED EMBODIMENTS

Embodiments of the present invention will now be described with reference to the drawings.

An overview of the present invention applied to embodiments will be given first and then the concrete contents of the embodiments will be described.

Figure 1:
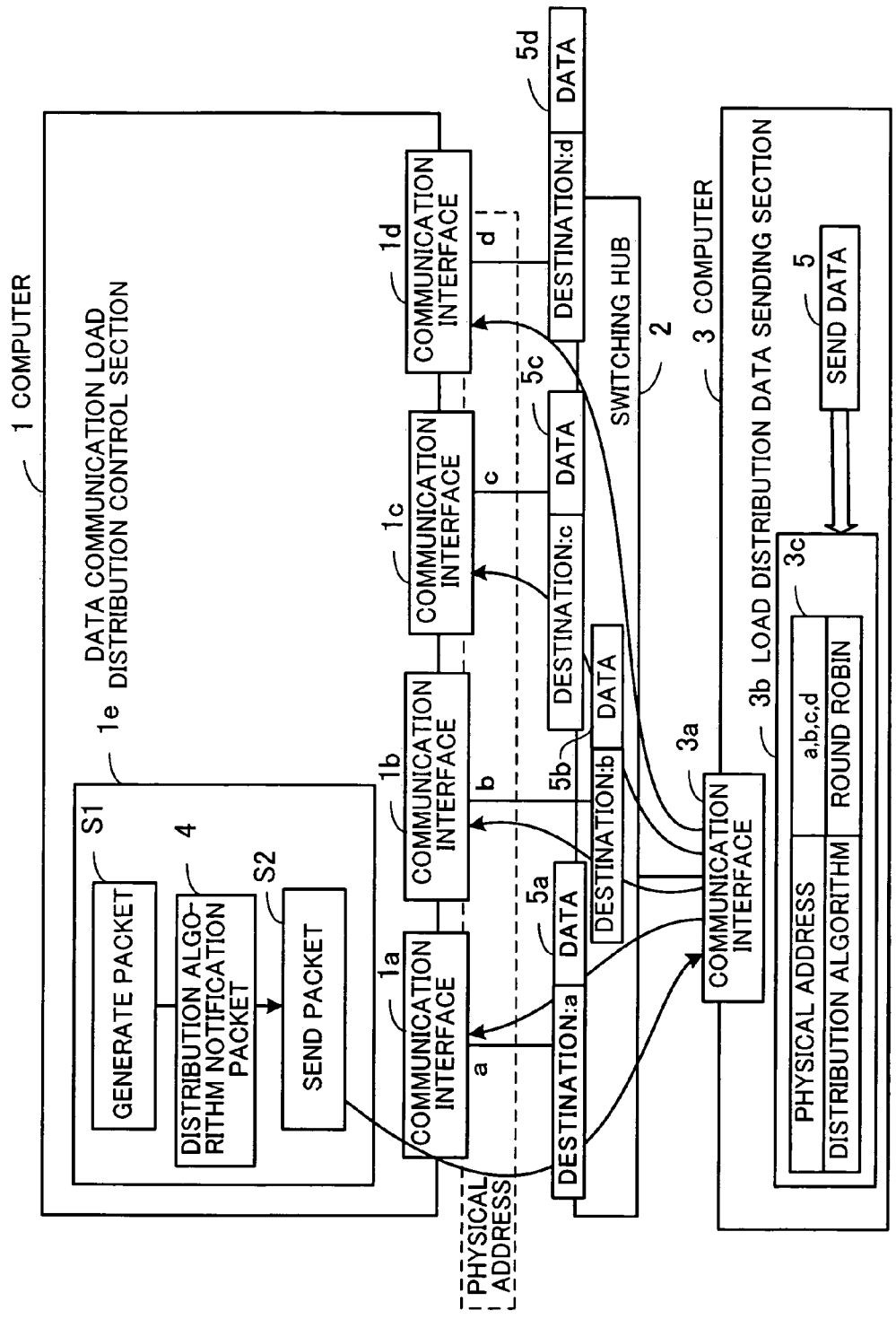
FIG. 1 is a schematic view of the present invention applied to embodiments.

FIG. 1 is a schematic view of the present invention applied to embodiments. The present invention is applied to data communication between computers 1 and 3. The computer 1 includes communication interfaces 1a, 1b, 1c, and 1d. Physical addresses of the communication interfaces 1a, 1b, 1c, and 1d are "a," "b," "c," and "d" respectively. The communication interfaces 1a, 1b, 1c, and 1d are connected to a switching hub 2 via different transmission lines.

The computer 1 actualizes the function of a data communication load distribution control section 1e by executing a data communication load distribution control program. The data communication load distribution control section 1e has the function of distributing a communication load on the transmission lines. To be concrete, the data communication load distribution control section 1e performs the following process.

The data communication load distribution control section 1e generates a distribution algorithm notification packet 4 including the physical addresses of the communication interfaces 1a, 1b, 1c, and 1d and a distribution algorithm used for distributing data sent from the computer 3 at the other end to the computer 1 among the communication interfaces 1a, 1b, 1c, and 1d (step S1). The data communication load distribution control section 1e then sends the distribution algorithm notification packet 4 to the computer 3 at the other end connected to the computer 1 via a network (step S2).

By doing so, the computer 3 can be informed about the physical addresses of the communication interfaces 1a, 1b, 1c, and 1d mounted on the computer 1 and the load distribution algorithm can be designated.

The computer 3 includes a communication interface 3a connected to the switching hub 2. In addition, by executing a load distribution data sending program, the computer 3 actualizes the function of a load distribution data sending section 3b for distributing a communication load on the transmission lines to the computer 1. To be concrete, the load distribution data sending section 3b performs the following process.

When the load distribution data sending section 3b receives the distribution algorithm notification packet 4 including the physical addresses of the communication interfaces 1a, 1b, 1c, and 1d and the distribution algorithm used for distributing data sent to the computer 1 among the communication interfaces 1a, 1b, 1c, and 1d, the load distribution data sending section 3b stores the physical addresses of the communication interfaces 1a, 1b, 1c, and 1d and the distribution algorithm in a data table 3c. In FIG. 1, the physical addresses "a," "b," "c," and "d" and the distribution algorithm "round robin" are registered.

The load distribution data sending section 3b then sets a communication interface which is a destination of send data 5 sent to the computer 1 at the other end in accordance with the distribution algorithm. In addition, the computer 3 designates the physical address of the set communication interface as a destination and sends the send data 5. For example, the send data 5 is divided into four pieces and the physical address "a" is designated as a destination of a first piece of data 5a sent. As a result, the piece of data 5a is transferred from the switching hub 2 to the communication interface 1a. The physical address "b" is designated as a destination of a second piece of data 5b sent. As a result, the piece of data 5b is transferred from the switching hub 2 to the communication interface 1b. The physical address "c" is designated as a destination of a third piece of data 5c sent. As a result, the piece of data 5c is transferred from the switching hub 2 to the communication interface 1c. The physical address "d" is designated as a destination of a fourth piece of data 5d sent. As a result, the piece of data 5d is transferred from the switching hub 2 to the communication interface 1d.

By doing so, the send data 5 is sent from the computer 3 to the computer 1 at the other end via the transmission lines on which the communication interfaces 1a, 1b, 1c, and 1d are located respectively in accordance with the distribution algorithm designated in the distribution algorithm notification packet 4, and the load on the transmission lines is distributed.

As stated above, the computer 1 informs the computer 3 about the physical addresses of the communication interfaces 1a, 1b, 1c, and 1d and the distribution algorithm by using the distribution algorithm notification packet 4. The computer 3 sends the send data 5 to the physical address of a communication interface determined in accordance with the distribution algorithm. Accordingly, even if the switching hub 2 does not have a trunking function, trunking can be performed by the use of a plurality of transmission lines. As a result, a highly flexible network system can be built.

Moreover, the switching hub 2 needs no trunking mechanism, so an inexpensive switching hub can be used. Furthermore, the computer 1 informs the computer 3 about the distribution algorithm. Therefore, a change in distribution algorithm or an increase or decrease in the number of communication interfaces can easily be dealt with.

If there are a plurality of computers 3 which communicate with the computer 1, then the computer 1 can use different communication interfaces for communicating with the plurality of computers 3 by informing them about different distribution algorithms.

In addition, to determine a communication interface on the computer 1 with which the computer 3 communicates, the network layer protocol and an upper layer protocol included in the OSI reference model may be referred to. For example, a communication interface on the computer 1 may be determined according to the type of an application used for communication.

Embodiments of the present invention in which the configuration shown in FIG. 1 is applied to a server client system will now be described concretely.

First Embodiment

A first embodiment of the present invention will be described first. In particular, the unit of a signal will be referred to as a frame in the following descriptions of the sending of data in the data link layer.

Figure 2:
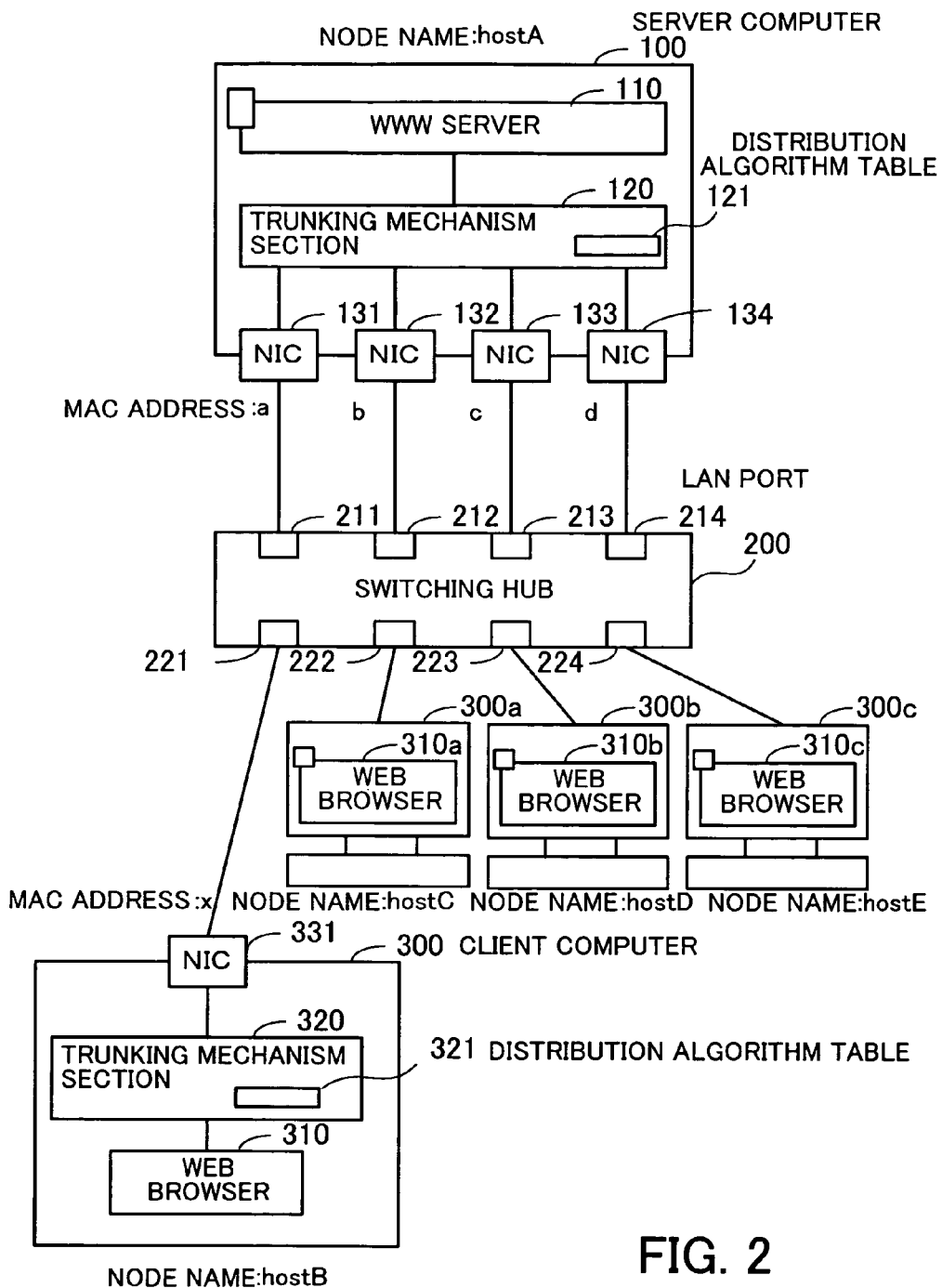
FIG. 2 shows an example of the configuration of a system to which the present invention is applied.

FIG. 2 shows an example of the configuration of a system to which the present invention is applied. Client computers 300, 300a, 300b, and 300c are connected to a server computer 100 via a switching hub 200.

The server computer 100 includes a world wide web (WWW) server 110, a trunking mechanism section 120, and NICs 131 through 134.

The WWW server 110 provides various pieces of content in response to a request from a Web browser 310 on the client computer 300, a Web browser 310a on the client computer 300a, a Web browser 310b on the client computer 300b, or a Web browser 310c on the client computer 300c. The node name of the server computer 100 is "hostA." The node names of the client computers 300, 300a, 300b, and 300c are "hostB," "hostC," "hostD," and "hostE" respectively.

The trunking mechanism section 120 is located between the WWW server 110 and the NICs 131 through 134. The trunking mechanism section 120 ensures a logical wide communication band by grouping the NICs 131 through 134 together. The trunking mechanism section 120 generates a packet including data to be sent from the WWW server 110 to the client computers 300, 300a, 300b, and 300c, selects one of the NICs 131 through 134, and sends the packet via the selected NIC.

The trunking mechanism section 120 has a distribution algorithm table 121. A load distribution algorithm used at data sending time is defined in the distribution algorithm table 121. The trunking mechanism E section 120 refers to the distribution algorithm table 121, and selects an NIC used for sending the packet so as to equalize a load caused by communication via each of the NICs 131 through 134. That is to say, load distribution is performed by, for example, round robin scheduling.

In addition, when the server computer 100 is started, the trunking mechanism section 120 sends a distribution algorithm notification packet to each of the client computers 300, 300*a*, 300*b*, and 300*c*. An algorithm for selecting a physical address (MAC address) which should be designated as the destination of a packet sent from each of the client computers 300, 300*a*, 300*b*, and 300*c* to the server computer 100 is specified in the distribution algorithm notification packet. A specified distribution algorithm is defined in the distribution algorithm table 121. The distribution algorithm notification packet also includes the MAC address of each of the NICs 131 through 134 on the server computer 100.

The NICs 131 through 134 are connected to the switching hub 200 by LAN cables or the like. The NICs 131 through 134 exchange frames with the switching hub 200. Different MAC addresses are set for the NICs 131 through 134. In the example shown in FIG. 2, the MAC addresses of the NICs 131 through 134 are "a," "b," "c," and "d" respectively.

The switching hub 200 has LAN ports 211 through 214 and 221 through 224. The switching hub 200 transfers a frame inputted from a LAN port to a LAN port to which an NIC corresponding to a MAC address, being the destination of the frame, is connected. The LAN ports 211 through 214 are connected to the NICs 131 through 134, respectively, on the server computer 100 via LAN cables. The LAN ports 221 through 224 are connected to the client computers 300, 300*a*, 300*b*, and 300*c*, respectively, via LAN cables.

Web browsers 310, 310*a*, 310*b*, and 310*c* are stored in the client computers 300, 300*a*, 300*b*, and 300*c* respectively. Each of the Web browsers 310, 310*a*, 310*b*, and 310*c* outputs a request to obtain content provided by the WWW server 110 in response to input provided by a user.

The client computer 300 includes a trunking mechanism section 320 and an NIC 331.

The trunking mechanism section 320 is located between the Web browser 310 and the NIC 331. The trunking mechanism section 320 sends a frame including a request to obtain content outputted from the Web browser 310 via the NIC 331.

The trunking mechanism section 320 has a distribution algorithm table 321. An algorithm for distributing a load caused at the time of sending data to the server computer 100 among the NICs 131 through 134 is defined in the distribution algorithm table 321. The distribution algorithm table 321 is set on the basis of the distribution algorithm notification packet broadcast from the trunking mechanism section 120 included in the server computer 100.

The trunking mechanism section 320 determines a destination MAC address of a frame sent to the server computer 100 at data sending time on the basis of the distribution algorithm table 321. For example, the trunking mechanism section 320 determines a MAC address by round robin scheduling so that frame sending will be performed equally via each of the NICs 131 through 134.

The NIC 331 is connected to the LAN port 221 on the switching hub 200 via a LAN cable and exchanges frames with the switching hub 200. The MAC address of the NIC 331 is "x."

The internal structure of the trunking mechanism section 120 included in the server computer 100 and the trunking mechanism section 320 included in the client computer 300 will now be described.

Figure 3:
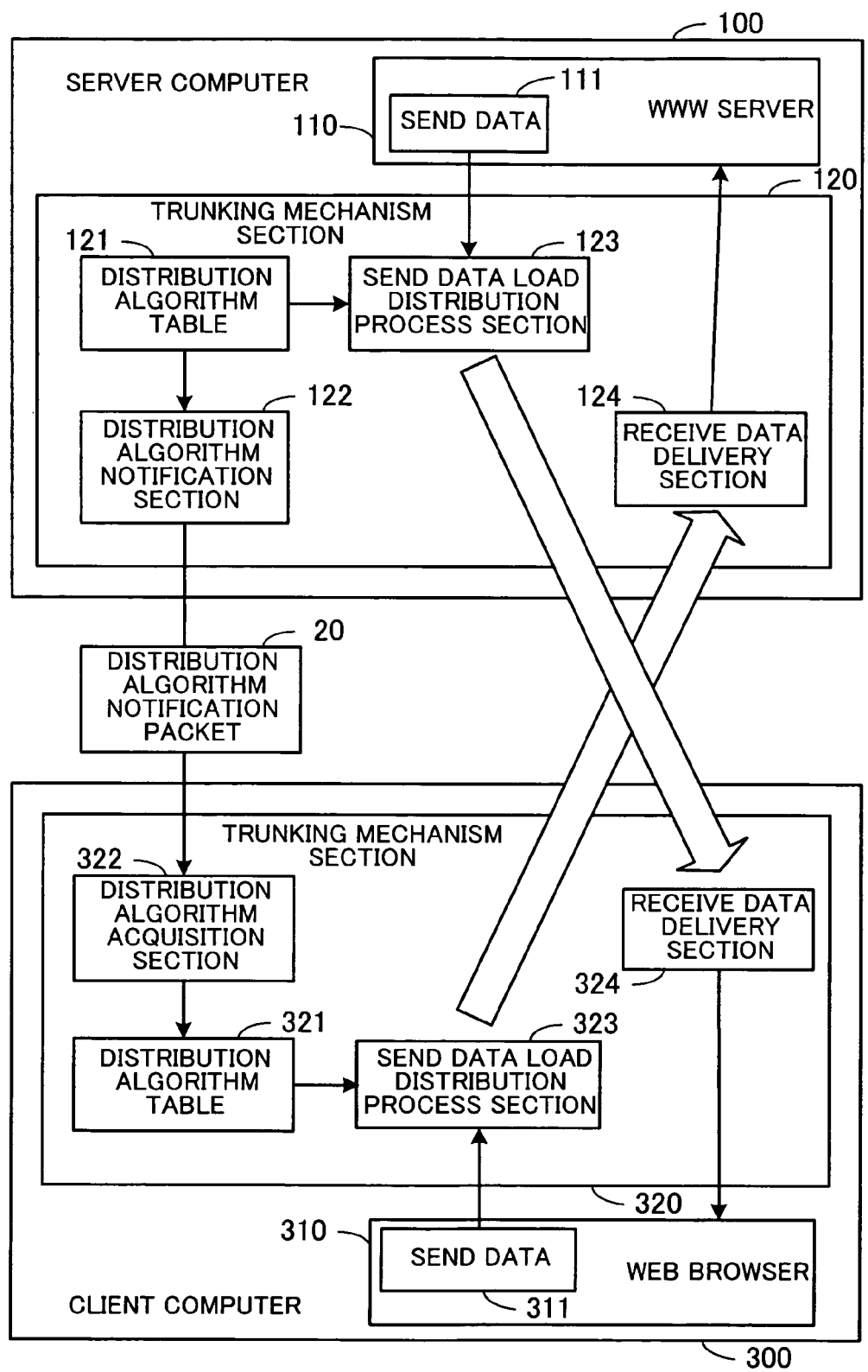
FIG. 3 shows the internal structure of trunking mechanism sections.

FIG. 3 shows the internal structure of the trunking mechanism sections. The trunking mechanism section 120 included in the server computer 100 includes the distribution algorithm table 121, a distribution algorithm notification section 122, a send data load distribution process section 123, and a receive data delivery section 124.

A load distribution algorithm applied to data communication between the server computer 100 and the client computer 300 is defined in the distribution algorithm table 121.

The distribution algorithm notification section 122 refers to the distribution algorithm table 121 and informs the client computer 300 by a distribution algorithm notification packet 20 about a distribution algorithm for data to be sent from the client computer 300 to the server computer 100.

When the send data load distribution process section 123 receives send data 111, the send data load distribution process section 123 refers to the distribution algorithm table 121 and determines a distribution algorithm corresponding to the client computer 300 at the receiving end. In accordance with the distribution algorithm determined, the send data load distribution process section 123 then assigns the send data 111 to the NICs 131 through 134 and sends it.

The receive data delivery section 124 passes the data it received from the client computer 300 to the WWW server 110. If the receive data had been divided and transferred by a distribution process and had been inputted from the NICs 131 through 134, then the receive data delivery section 124 concatenates the data which had been divided and passes the concatenated data to the WWW server 110.

The trunking mechanism section 320 included in the client computer 300 includes the distribution algorithm table 321, a distribution algorithm acquisition section 322, a send data load distribution process section 323, and a receive data delivery section 324.

A load distribution algorithm applied to data communication between the server computer 100 and the client computer 300 is defined in the distribution algorithm table 321.

The distribution algorithm acquisition section 322 receives the distribution algorithm notification packet 20 sent from the server computer 100 and updates the contents of the distribution algorithm table 321.

When the send data load distribution process section 323 receives send data 311, the send data load distribution process section 323 refers to the distribution algorithm table 321 and determines a distribution algorithm corresponding to the server computer 100 at the receiving end. In accordance with the distribution algorithm determined, the send data load distribution process section 323 assigns pieces of data included in the send data 311 to the NICs 131 through 134 and sends them.

The receive data delivery section 324 passes data it received from the server computer 100 to the Web browser 310. If the receive data had been divided and transferred by a distribution process and had been sent via the NICs 131 through 134, then the receive data delivery section 324 concatenates the data which had been divided and passes the concatenated data to the Web browser 310.

In FIGS. 2 and 3, only the configuration of the client computer 300 is shown in detail. However, the configuration of each of the other client computers 300*a*, 300*b*, and 300*c* is the same as that of the client computer 300.

In the system the configuration of which has been described above, requests to obtain content outputted from the Web browser 310 on the client computer 300, the Web browser 310*a* on the client computer 300*a*, the Web browser 310*b* on the client computer 300*b*, and the Web browser 310*c* on the client computer 300*c* are sent to the server computer 100 via the switching hub 200. The WWW server 110 included in the server computer 100 then delivers the content requested.

In this case, the server computer 100 and the switching hub 200 are connected via the four LAN cables, so a bandwidth four times the bandwidth obtained by connecting the server computer 100 and the switching hub 200 via one transmission line can be actualized. For example, if one transmission line has a bandwidth of 100 Mbps, then communication can be performed between the server computer 100 and the switching hub 200 at a rate of 400 Mbps. As a result, the system can withstand a heavy load caused by simultaneous access from the client computers 300, 300a, 300b, and 300c to the server computer 100.

Furthermore, data sent from the server computer 100 to the client computers 300, 300a, 300b, and 300c is assigned equally to the NICs 131 through 134 by the trunking mechanism section 120, so traffic does not concentrate on one line. Moreover, data sent from the client computer 300 to the server computer 100 is assigned equally to the NICs 131 through 134 by the trunking mechanism section 320, so traffic does not concentrate on one line.

Figure 4:
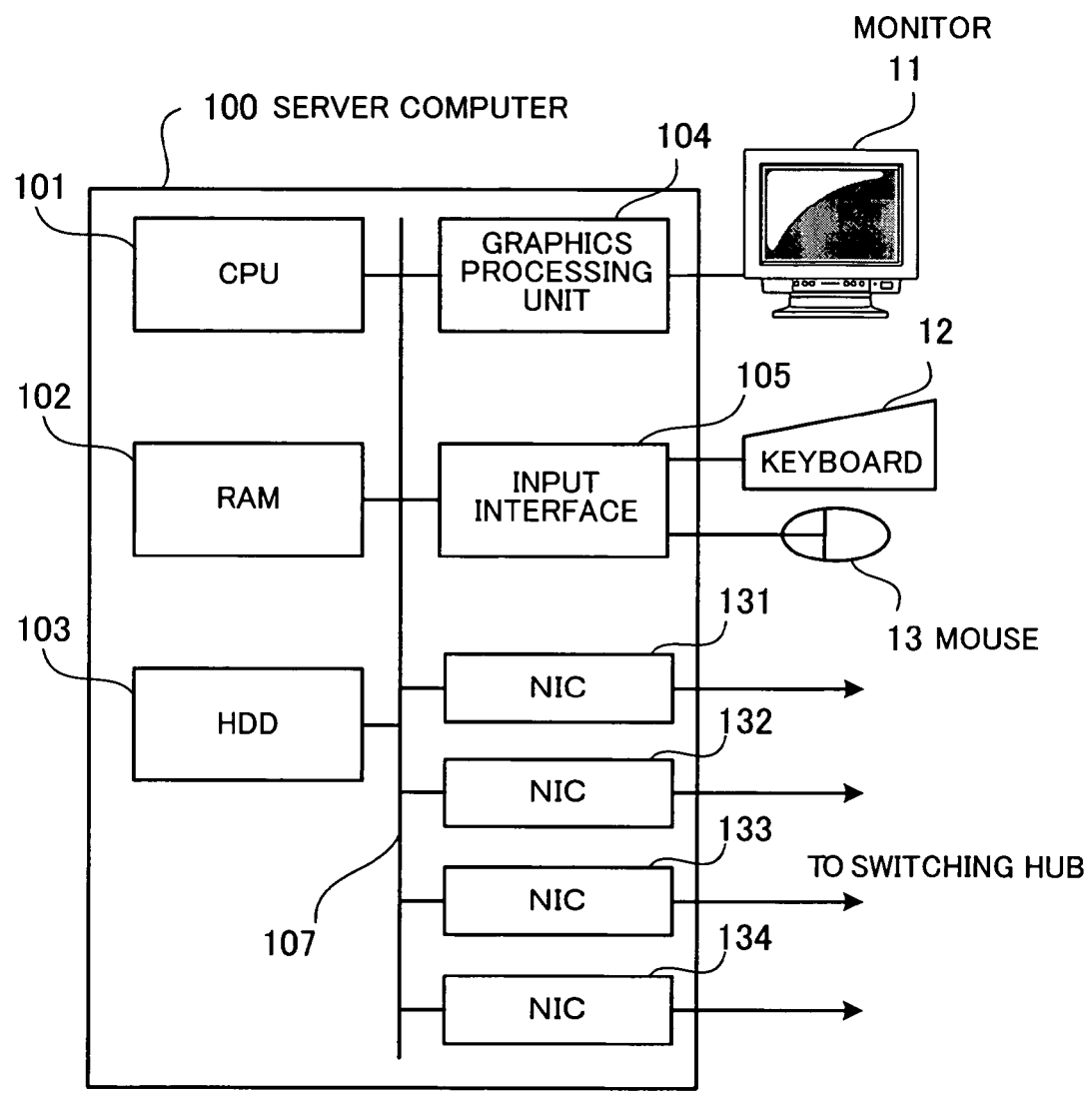
FIG. 4 shows an example of the hardware configuration of a server computer.

FIG. 4 shows an example of the hardware configuration of the server computer. The whole of the server computer 100 is controlled by a central processing unit (CPU) 101. A random access memory (RAM) 102, a hard disk drive (HDD) 103, a graphics processing unit 104, an input interface 105, and NICs 131 through 134 are connected to the CPU 101 via a bus 107.

The RAM 102 temporarily stores at least part of an operating system (OS) or an application program executed by the CPU 101. The RAM 102 also stores various pieces of data which the CPU 101 needs to perform a process. The HDD 103 stores the OS and application programs.

A monitor 11 is connected to the graphics processing unit 104. In accordance with instructions from the CPU 101, the graphics processing unit 104 displays an image on a screen of the monitor 11. A keyboard 12 and a mouse 13 are connected to the input interface 105. The input interface 105 sends a signal sent from the keyboard 12 or the mouse 13 to the CPU 101 via the bus 107. The NICs 131 through 134 are connected to a switching hub 200.

By adopting the above-mentioned hardware configuration, the processing function of the first embodiment can be actualized. In FIG. 4, the hardware configuration of the server computer 100 is shown. With the exception that the number of NICs is one, the client computers 300, 300a, 300b, and 300c can also be actualized by adopting the same hardware configuration.

A process for performing data communication will now be described with communication between the server computer 100 and the client computer 300 as an example.

Figure 5:
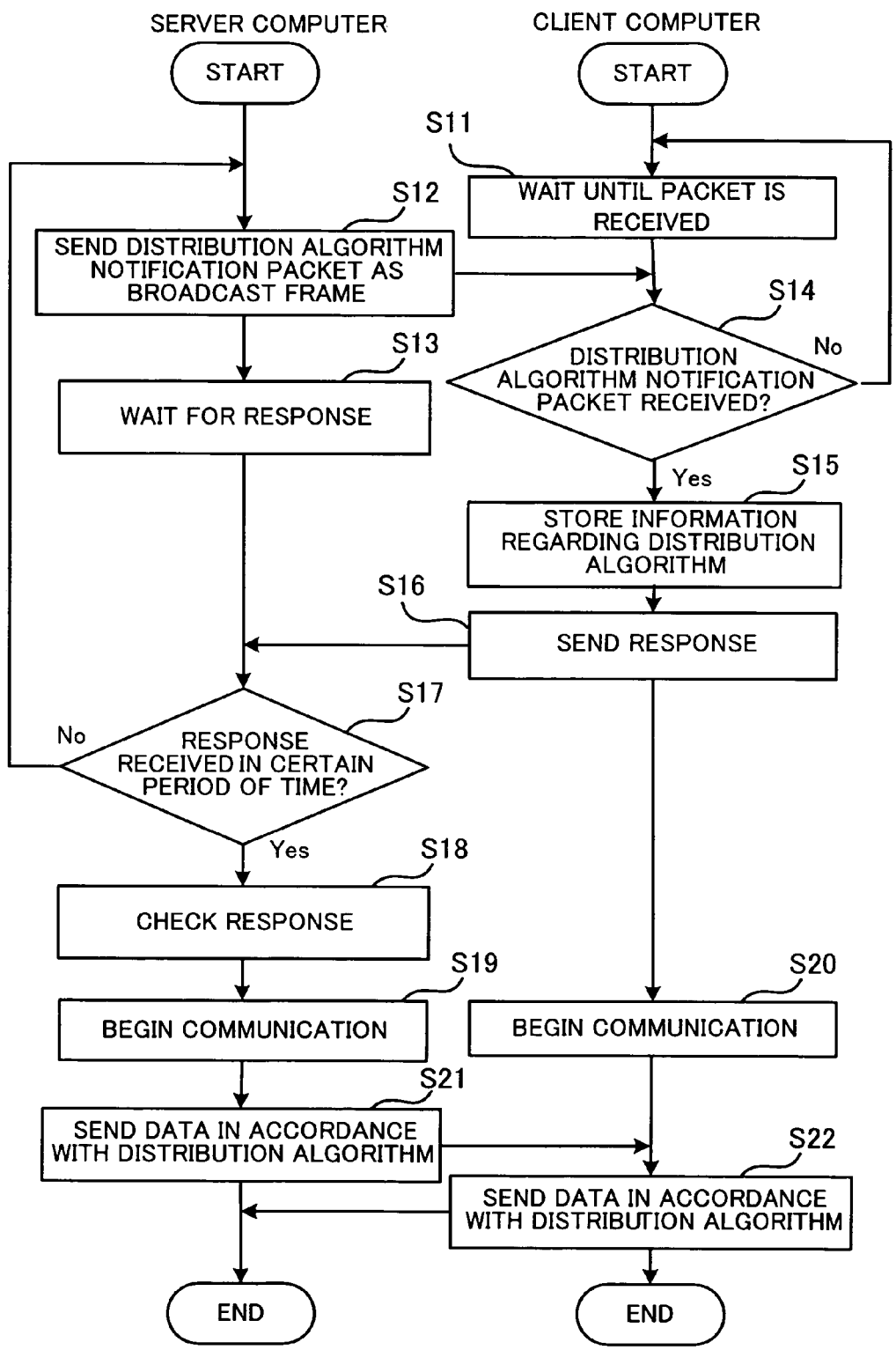
FIG. 5 is a flow chart showing the procedure of a data communication process.

FIG. 5 is a flow chart showing the procedure of a data communication process. A process performed by the server computer 100 is shown on the left-hand side of FIG. 5 and a process performed by the client computer 300 is shown on the right-hand side of FIG. 5. The data communication process shown in FIG. 5 will now be described in order of step number.

[Step S11] The client computer 300 waits until it receives the distribution algorithm notification packet 20.

[Step S12] The server computer 100 sends the distribution algorithm notification packet 20 as a broadcast frame at the time of, for example, the system being started.

[Step S13] The server computer 100 then waits for a response from the client computer 300.

[Step S14] The client computer 300 determines whether it has received the distribution algorithm notification packet 20. If the client computer 300 has received the distribution algorithm notification packet 20, then step S15 is performed. If the client computer 300 has not received the distribution algorithm notification packet 20, then step S11 is performed. Accordingly, the client computer 300 continues to wait until it receives the distribution algorithm notification packet 20.

[Step S15] The client computer 300 extracts information regarding a distribution algorithm from the distribution algorithm notification packet 20 sent from the server computer 100 and stores it in the distribution algorithm table 321.

[Step S16] The client computer 300 sends the server computer 100 a response to the distribution algorithm notification packet 20.

[Step S17] The server computer 100 determines whether it has received a response in a certain period of time. If the server computer 100 has received a response in the certain period of time, then step S18 is performed. If the server computer 100 has not received a response in the certain period of time, then step S12 is performed and the distribution algorithm notification packet 20 is sent again.

[Step S18] The server computer 100 checks the contents of the response and adds information including a MAC address of the client computer 300 to the distribution algorithm table 121.

[Step S19] The server computer 100 begins to communicate with the client computer 300.

[Step S20] The client computer 300 begins to communicate with the server computer 100.

[Step S21] The server computer 100 sends data in accordance with the distribution algorithm.

[Step S22] The client computer 300 sends data in accordance with the distribution algorithm.

As stated above, the server computer 100 sends the distribution algorithm notification packet to the client computer 300 to inform the client computer 300 of the distribution algorithm. As a result, the client computer 300 recognizes the configuration of the NICs on the server computer 100 and can send data with a load distributed among the NICs.

Figure 6:
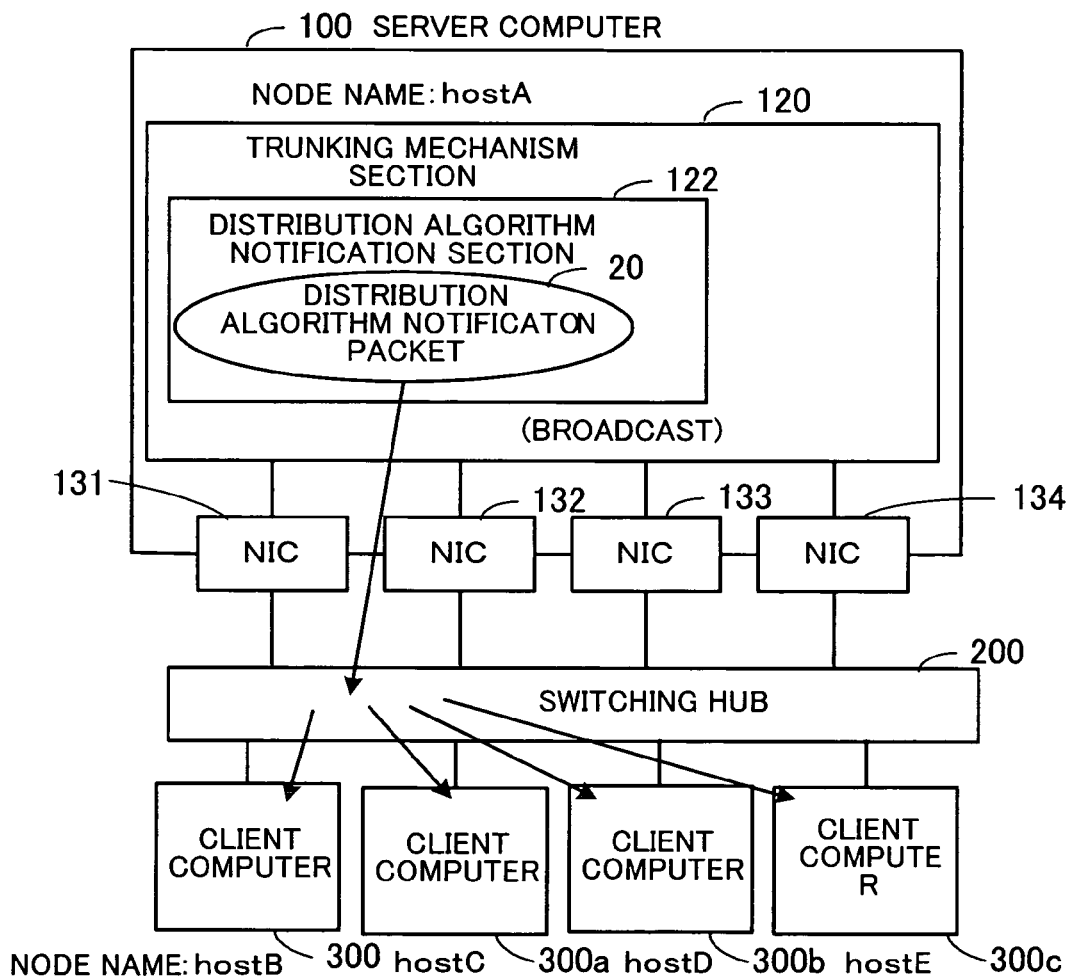
FIG. 6 is a schematic view showing a distribution algorithm notification process.

FIG. 6 is a schematic view showing a distribution algorithm notification process. Before the server computer 100 communicates with the client computers 300, 300a, 300b, and 300c, the distribution algorithm notification section 122 included in the trunking mechanism section 120 generates the distribution algorithm notification packet 20 and broadcasts it as an Ethernet (registered trademark) frame via any NIC. As a result, the distribution algorithm notification packet 20 is passed to each of the client computers 300, 300a, 300b, and 300c. For example, to perform receiving distribution by round robin scheduling, instructions to send data to the NICs 131 through 134 on the server computer 100 by round robin scheduling are given by the distribution algorithm notification packet 20.

Each of the client computers 300, 300a, 300b, and 300c which received the distribution algorithm notification packet 20 sends a response packet to the server computer 100.

The structure of a frame used for distribution algorithm notification, a response, and the like will now be described.

Figure 7:
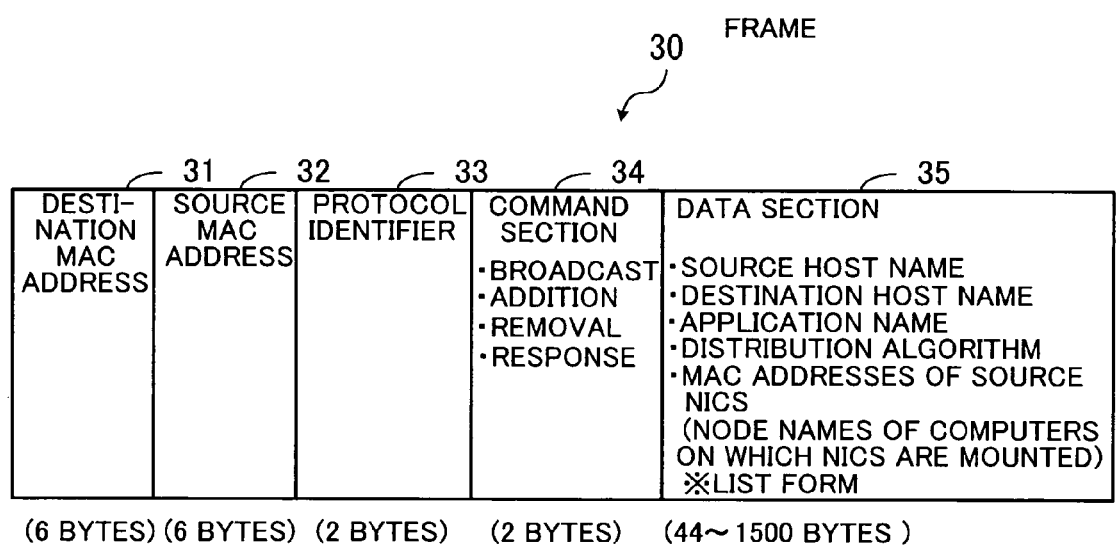
FIG. 7 shows the structure of a frame for a distribution algorithm notification packet.

FIG. 7 shows the structure of a frame for a distribution algorithm notification packet. A frame 30 includes a destination MAC address 31, a source MAC address 32, a protocol identifier 33, a command section 34, and a data section 35.

A MAC address which indicates the destination of the frame is set in the destination MAC address 31. When the distribution algorithm notification packet 20 is sent, the value "FF-FF-FF-FF-FF-FF" which indicates broadcasting is set.

For example, to add an distribution algorithm if the MAC address of the NIC on the client computer 300 and the MAC addresses of NICs on the client computers 300a, 300b, and 300c are known, the MAC address of a destination NIC is set in the destination MAC address 31. A plurality of distribution algorithm notification packets 20 may be sent.

The MAC address of an NIC on the server computer 100 itself is set in the source MAC address 32. The server computer 100 selects one of the NICs for sending the distribution algorithm notification packet 20. The MAC address of the selected NIC is set in the source MAC address 32.

An identifier which indicates that the frame is a distribution algorithm notification packet is set in the protocol identifier 33. Each of the client computers 300, 300a, 300b, and 300c recognizes a packet it received as the distribution algorithm notification packet 20 by checking a protocol identifier.

The type of an information packet is set in the command section 34. Information packets are classed under four types: broadcast, addition, removal, and response.

The packet type "broadcast" indicates that the frame is for broadcasting distribution algorithm data. At the time of beginning system operation, the distribution algorithm notification packet 20 in which "broadcast" is set in the command section 34 is sent. The frame in which "broadcast" is set in the command section 34 is sent from the server computer 100 to the client computers 300, 300a, 300b, and 300c.

The packet type "addition" indicates that the frame is for giving instructions to add distribution algorithm data. The frame in which "addition" is set in the command section 34 is sent from the server computer 100 to the client computers 300, 300a, 300b, and 300c.

The packet type "removal" indicates that the frame is for giving instructions to remove distribution algorithm data. The frame in which "removal" is set in the command section 34 is sent from the server computer 100 to the client computers 300, 300a, 300b, and 300c.

The packet type "response" indicates that the frame is a response to the broadcasting of the distribution algorithm data, the instructions to add the distribution algorithm data, or the instructions to remove the distribution algorithm data. The frame in which "response" is set in the command section 34 is sent from the client computers 300, 300a, 300b, and 300c to the server computer 100.

The contents of the distribution algorithm data are set in the data section 35. To be concrete, information, such as the node name of the server computer 100, the node names of the client computers 300, 300a, 300b, and 300c, an application name, a distribution algorithm, and the MAC addresses of the NICs 131 through 134 on the server computer 100, is set in the data section 35. If the server computer 100 is made up of a plurality of computers (cluster of computers), the node names of computers on which the NICs 131 through 134 are mounted are added as information supplementary to the MAC addresses of the NICs 131 through 134.

The contents of the data section 35 are represented in list form according to client computers. Each of the client computers 300, 300a, 300b, and 300c extracts only information corresponding thereto and sets it in the distribution algorithm table.

With Ethernet (registered trademark), each of the NICs 131 through 134 has a unique network address called a MAC address. Accordingly, even if the switching hub 200 has no trunking function, each of the client computers 300, 300a, 300b, and 300c can perform the same distribution process that is actualized by the switching hub 200 having a trunking function by sending an Ethernet frame to the MAC addresses of the four NICs 131 through 134, about which the server computer 100 informed, by round robin scheduling.

If an internet protocol, such as the address resolution protocol (ARP), is used, then the server computer 100 can inform each of the client computers 300, 300a, 300b, and 300c about only one MAC address. Moreover, with the ARP, the server computer 100 cannot inform each of the client computers 300, 300a, 300b, and 300c about distribution algorithm information. As a result, each of the client computers 300, 300a, 300b, and 300c can use only one NIC for sending data to the server computer 100. For example, if a large amount of data is sent from the client computer 300 to the server computer 100, only a specific one of the four NICs is used for receiving the data and trunking is not performed. In the first embodiment, load distribution by trunking can be performed even in such a case.

FIG. 8 shows an example of the contents of a data section included in a distribution algorithm notification packet. FIG. 8 shows an example of the data section 35 in the case of performing load distribution for a file transfer based on the file transfer protocol (FTP) by round robin scheduling.

In the data section 35, source node names, destination node names, application names, algorithms used, and the MAC addresses of NICs used are set according to destination node names. Each source node name is "hostA." Destination node names are "hostB," "hostC," "hostD," and "hostE." Each application name is "ftp." Each algorithm used is "round robin." The MAC addresses "a," "b," "c," and "d" of the NICs 131 through 134, respectively, are set in the MAC Address column.

When the server computer 100 informs each of the client computers 300, 300a, 300b, and 300c about the distribution algorithm by the above distribution algorithm notification packet 20, the contents of the distribution algorithm are added to each distribution algorithm table. As a result, distribution algorithm tables are built both on the server computer 100 and on the client computers 300, 300a, 300b, and 300c and load distribution is performed in accordance with these distribution algorithm tables.

FIG. 9 shows an example of the data structure of the distribution algorithm table on the server computer. The distribution algorithm table 121 includes Source Node Name, Destination Node Name, Application Name, Algorithm, Source NIC, Destination NIC, and Flag columns. Pieces of information in these columns arranged in the same row are associated with one another and form a record.

The node name (IP address, for example) of the server computer 100 is included in the Source Node Name column.

The node names (IP addresses, for example) of the client computers 300, 300a, 300b, and 300c with which the server computer 100 communicates are included in the Destination Node Name column.

The name (telnet, ftp, or the like) of an application used for data communication for which load distribution is performed is included in the Application Name column.

A distribution algorithm (round robin, fixed NIC, TCP connection equal distribution, or the like) used for sending or receiving data on the basis of an application designated in the Application Name column is included in the Algorithm column.

The MAC address of one of the NICs 131 through 134 on the server computer 100 is included in the Source NIC column. If the MAC addresses of two or more NICs are included, they are separated by a comma and are represented in list form.

The MAC address of the NIC on each of the client computers 300, 300a, 300b, and 300c with which the server computer 100 communicates is included in the Destination NIC column (if the MAC addresses of two or more NICs are included, they are represented in list form).

The Flag column indicates that table information in each record is valid or invalid. "valid" indicates that an exchange of a distribution algorithm is completed and that the system is in a state in which communication can be performed. "invalid" indicates that an exchange of a distribution algorithm is not yet completed and that the system is in a state in which communication cannot be performed.

By adopting the above table structure, distribution algorithms or NICs used can be designated according to destination nodes. Moreover, distribution algorithms or NICs used can be designated according to applications.

In FIG. 9, the distribution algorithm table 121 on the server computer 100 is shown. However, the data structure of the distribution algorithm table 321 on the client computer 300 is the same as that of the distribution algorithm table 121. The client computer 300 includes only one NIC 331. Therefore, one MAC address is set in a Source NIC column and the MAC addresses of the NICs 131 through 134 on the server computer 100 are set in a Destination NIC column.

Figure 10:
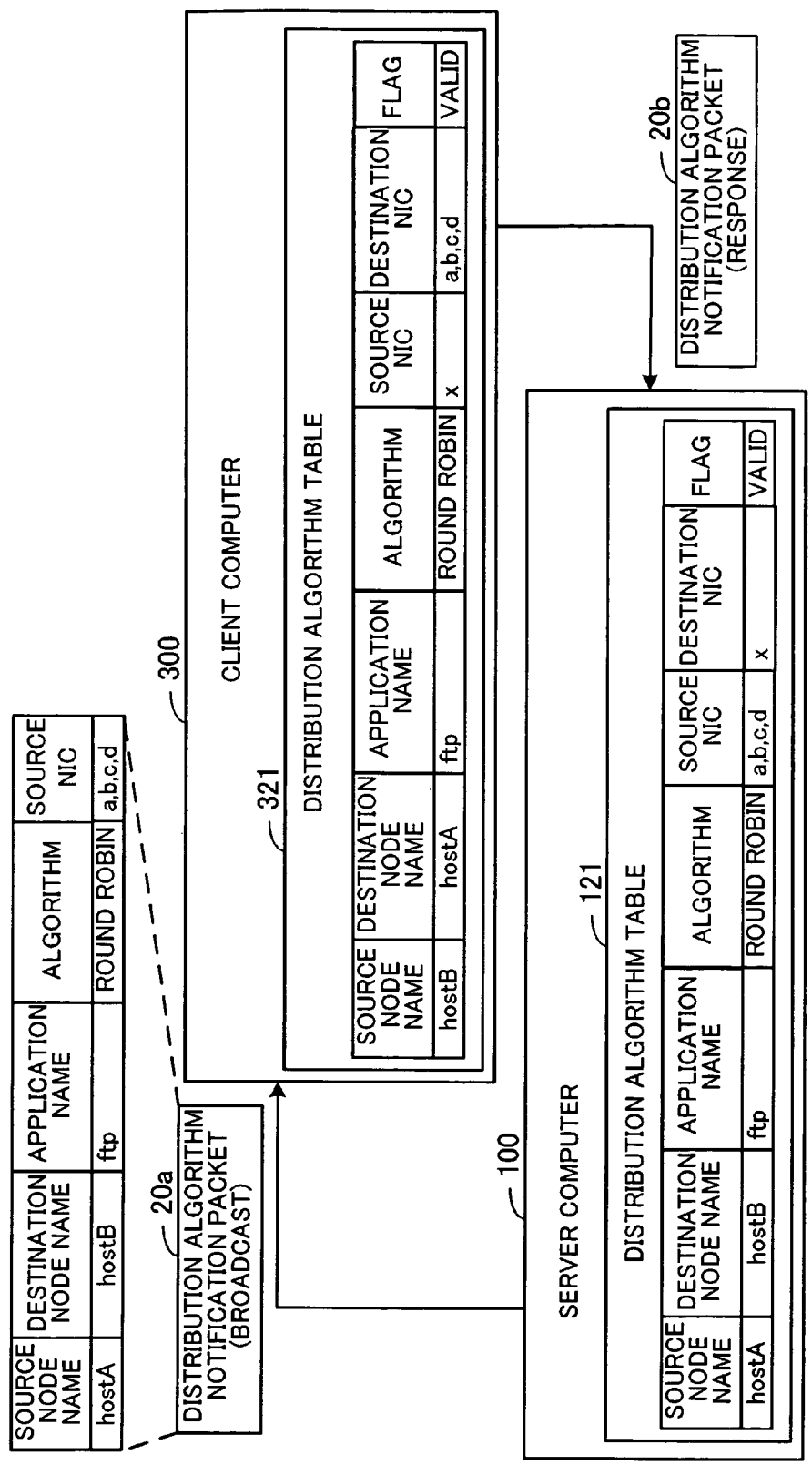
FIG. 10 shows an example of how to register information in a distribution algorithm table in accordance with a distribution algorithm notification packet.

FIG. 10 shows an example of how to register information in a distribution algorithm table in accordance with a distribution algorithm notification packet. As shown in FIG. 10, a distribution algorithm notification packet 20a the packet type of which is "broadcast" is sent first from the server computer 100 to the client computer 300. In this example, a source node name is "hostA," a destination node name is "hostB," an application name is "ftp," an algorithm is "round robin," and source NICs are "a, b, c, and d."

The client computer 300 which received the distribution algorithm notification packet 20a registers the source node name, the destination node name, and the source NICs included therein in the distribution algorithm table 321 as a destination node name, a source node name and destination NICs respectively. The client computer 300 then sets the MAC address "x" of its NIC 331 and "valid" in a Source NIC column and a Flag column, respectively, in a record registered. The client computer 300 sends the server computer 100 a distribution algorithm notification packet 20b which includes the MAC address "x" of the NIC 331 mounted on the client computer 300 and the packet type of which is "response."

When the server computer 100 receives the distribution algorithm notification packet 20b the packet type of which is "response," the server computer 100 registers a record formed by adding the destination NIC "x" and the flag "valid" to the contents of the distribution algorithm notification packet 20a in the distribution algorithm table 121.

On the basis of the distribution algorithm tables built in this way, data communication is performed between the server computer 100 and the client computer 300 with a load distributed.

Figure 11:
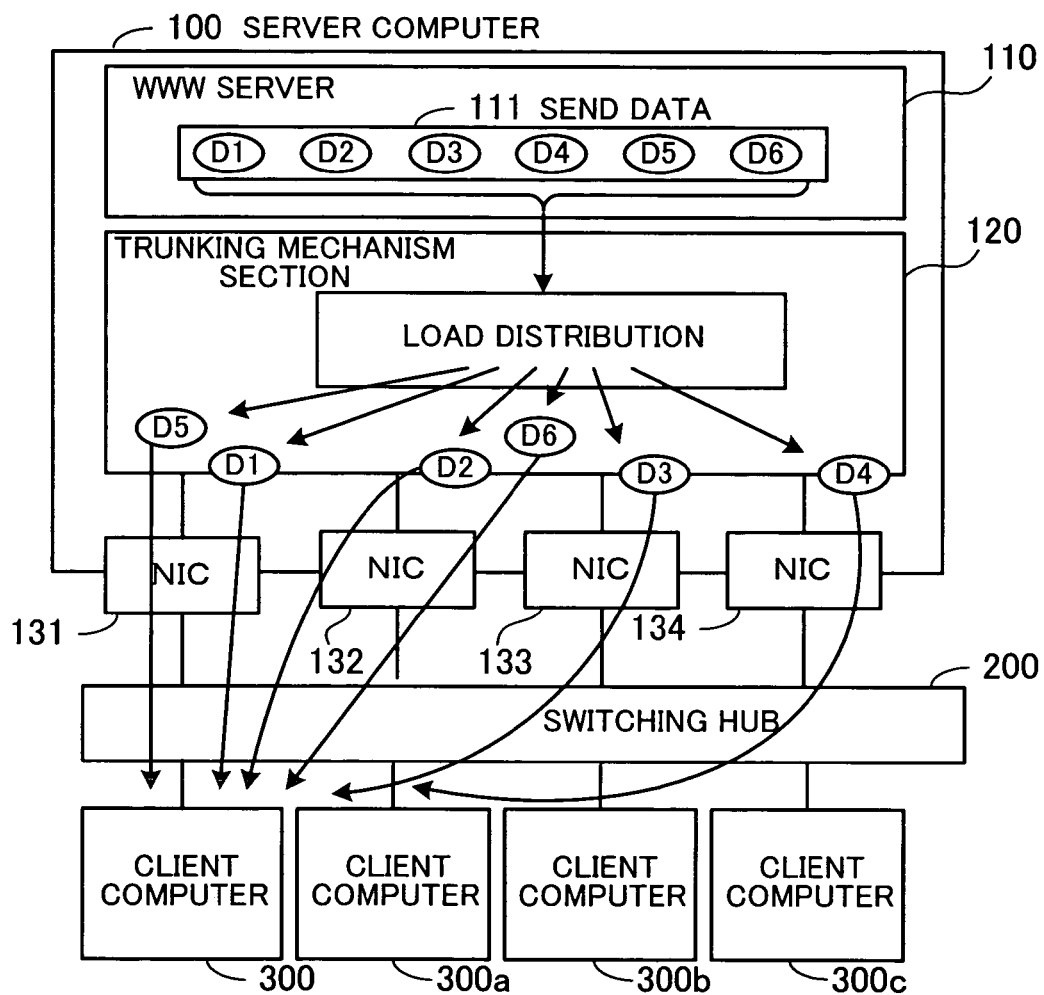
FIG. 11 shows how load distribution is performed when data is sent from the server computer.

FIG. 11 shows how load distribution is performed when data is sent from the server computer. In this example, load distribution is performed in accordance with the distribution algorithm of round robin. With the round robin scheduling, data is assigned to the NICs 131 through 134 in predetermined order. For example, data is assigned to the NICs 131 through 134 in the order of the NIC 131, the NIC 132, the NIC 133, and the NIC 134. The NIC 131 comes after the NIC 134.

The send data 111 to be sent from the WWW server 110 to the client computer 300 is passed to the trunking mechanism section 120. It is assumed that the trunking mechanism section 120 divides the send data 111 into six pieces of data (data D1, data D2, data D3, data D4, data D5, and data D6) and that the trunking mechanism section 120 sends these pieces of data.

The trunking mechanism section 120 assigns the send data 111 to the NICs 131 through 134 in accordance with the round robin scheduling. As a result, the data D1 is sent to the client computer 300 via the NIC 131. The data D2 is sent to the client computer 300 via the NIC 132. The data D3 is sent to the client computer 300 via the NIC 133. The data D4 is sent to the client computer 300 via the NIC 134. The data D5 is sent to the client computer 300 via the NIC 131. The data D6 is sent to the client computer 300 via the NIC 132.

As stated above, the send data 111 to be sent from the server computer 100 to the client computer 300 is passed to the switching hub 200 with the load distributed among the transmission lines, and is then passed to the client computer 300.

Figure 12:
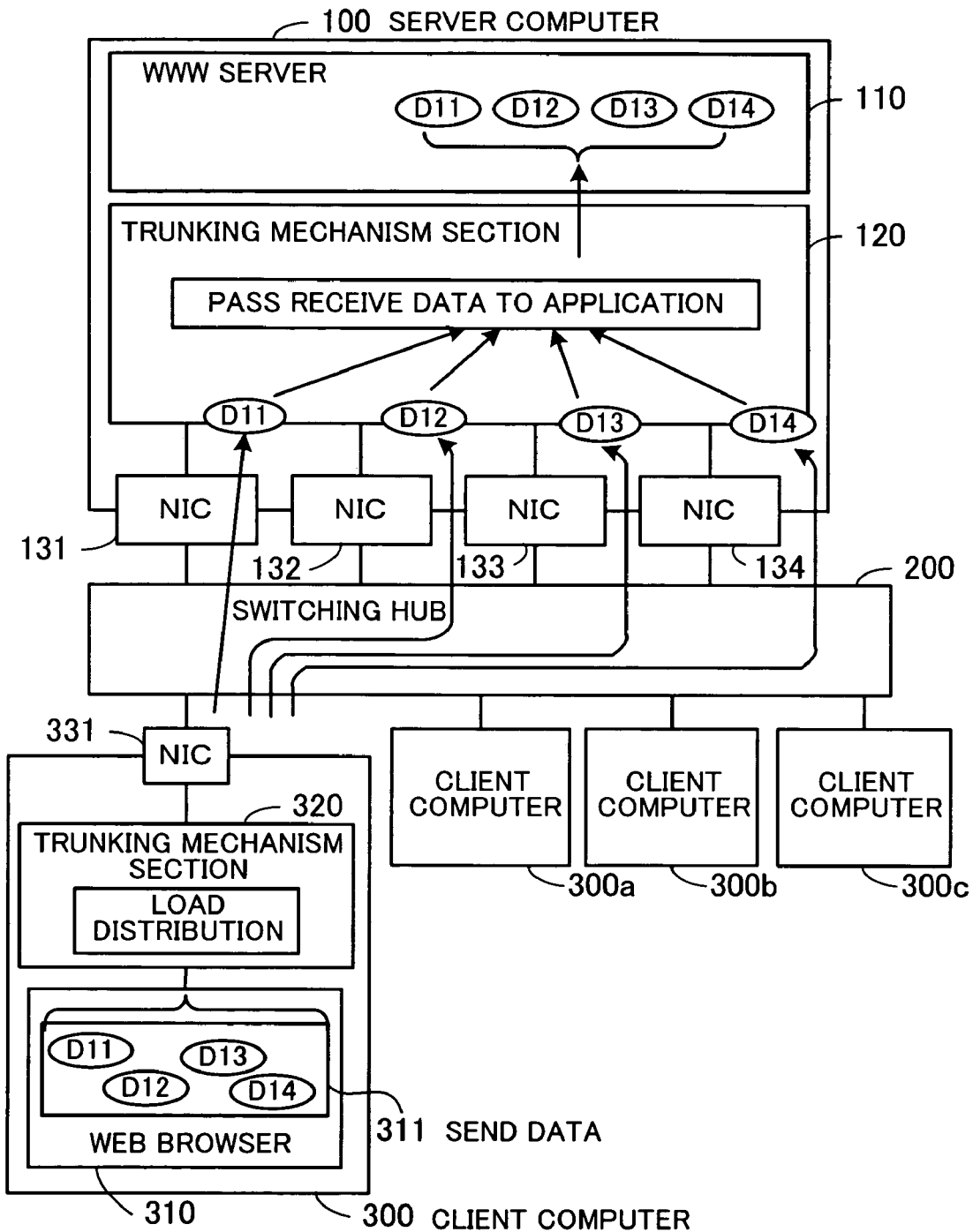
FIG. 12 shows how load distribution is performed when data is sent from a client computer.

FIG. 12 shows how load distribution is performed when data is sent from the client computer. In this example, load distribution is performed in accordance with the distribution algorithm of round robin.

The send data 311 to be sent from the client computer 300 to the WWW server 110 is passed to the trunking mechanism section 320. It is assumed that the trunking mechanism section 320 divides the send data 311 into four pieces of data (data D11, data D12, data D13, and data D14) and that the trunking mechanism section 120 sends these pieces of data.

The trunking mechanism section 320 assigns the send data 311 to the NICs 131 through 134 in accordance with the round robin scheduling. The MAC address of an NIC to which a piece of data is assigned is set as a destination MAC address included in a frame by which the piece of data is sent. The switching hub 200 refers to the destination MAC address to determine a LAN port from which the frame is to be outputted, so the piece of data is sent to the NIC to which it is assigned.

In this example, the data D11 is sent to the NIC 131 on the server computer 100. The data D12 is sent to the NIC 132 on the server computer 100. The data D13 is sent to the NIC 133 on the server computer 100. The data D14 is sent to the NIC 134 on the server computer 100.

As stated above, the send data 311 to be sent from the client computer 300 to the server computer 100 is passed to the server computer 100 via the switching hub 200 with the load distributed among the transmission lines.

Therefore, even if the switching hub 200 has no trunking mechanism, data communication can be performed between the server computer 100 and the switching hub 200 with the load distributed among the transmission lines. As a result, when a system in which trunking is performed is built, a switching hub which cannot accommodate trunking can be used. This widens the choices.

Furthermore, each of the client computers 300, 300a, 300b, and 300c has distribution algorithm information. Accordingly, even if communication is performed between only two machines, sending/receiving distribution by trunking can be actualized and exactly the same wide band that is obtained by using a switch capable of accommodating trunking can be actualized.

In addition, each of the client computers 300, 300a, 300b, and 300c manages load distribution, so a distribution algorithm can be designated according to an application. Conventionally, a trunking process is performed by the switching hub 200. In this case, an application cannot be identified because the switching hub 200 functions at the data link layer of the OSI reference model. Therefore, trunking corresponding to an application cannot be performed. In the first embodiment, the client computer 300 can designate a distribution algorithm according to an application, so a highly flexible trunking mechanism can be provided.

Second Embodiment

A second embodiment of the present invention will now be described. In the second embodiment, the present invention is applied to a system in which a plurality of server computers form a cluster by operating in cooperation with one another.

Figure 13:
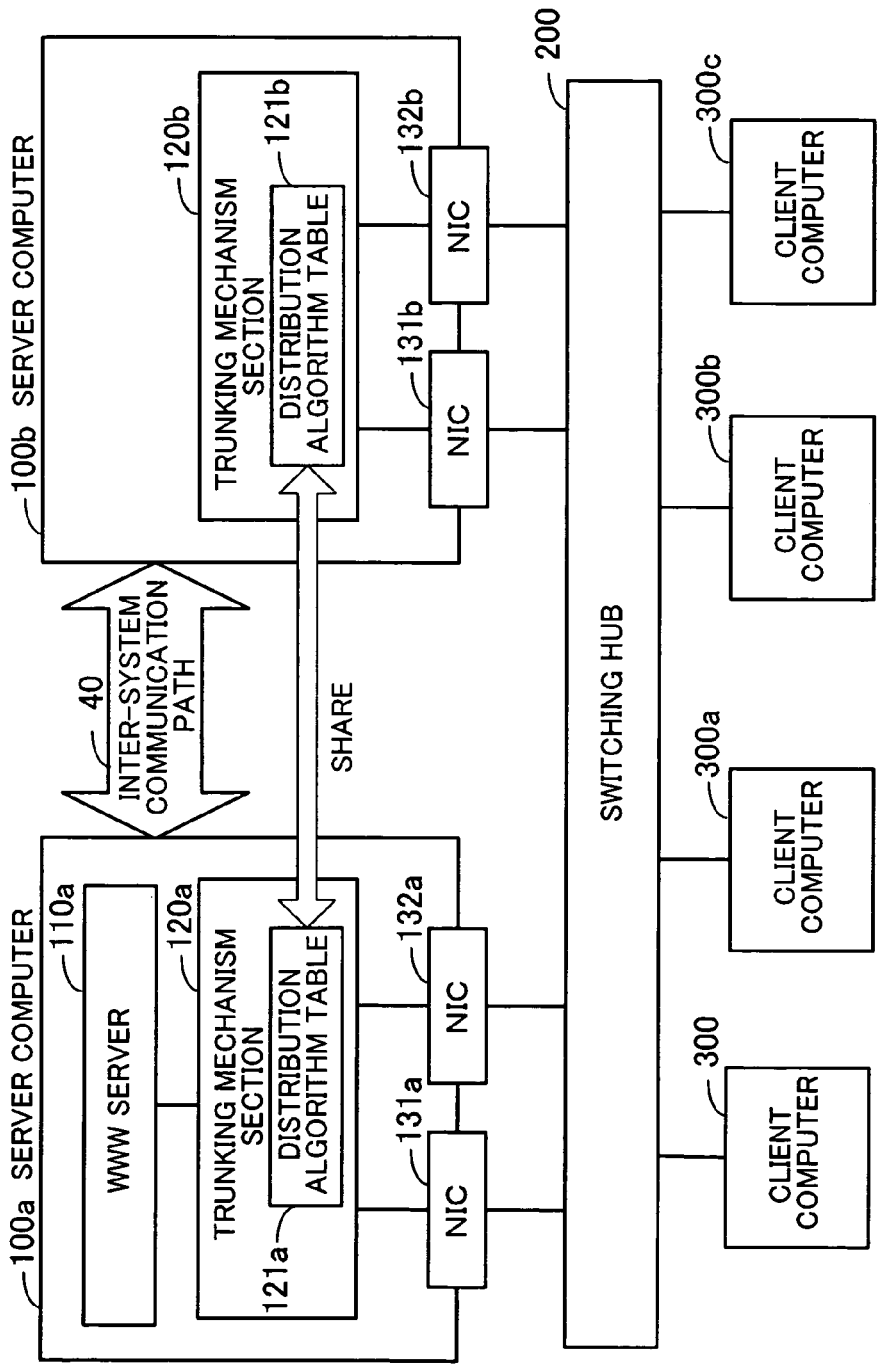
FIG. 13 shows an example of the configuration of a system according to a second embodiment of the present invention.

FIG. 13 shows an example of the configuration of a system according to the second embodiment of the present invention. In the second embodiment, two server computers 100a and 100b are connected to each other by an inter-system communication path 40. The inter-system communication path 40 is a communication interface which enables high-speed communication compared with the case of a LAN. Components except the server computers 110a and 100b are the same as those in the first embodiment. Therefore, they will be marked with the same symbols that are used in the first embodiment (see FIG. 2), and descriptions of them will be omitted.

The server computer 100a includes a WWW server 110a, a trunking mechanism section 120a, and NICs 131a and 132a. The trunking mechanism section 120a has a distribution algorithm table 121a. Similarly, the server computer 100b includes a trunking mechanism section 120b and NICs 131b and 132b. The trunking mechanism section 120b has a distribution algorithm table 121b.

As stated above, the server computer 100a includes the two NICs 131a and 132a and the server computer 100b includes the two NICs 131b and 132b. It is assumed that more than two NICs cannot be mounted on each of the server computers 100a and 100b because of a restriction based on hardware specifications.

The trunking mechanism sections 120a and 120b included in the server computers 100a and 100b, respectively, share control information for trunking registered in the distribution algorithm tables 121a and 121b via the inter-system communication path 40.

The trunking mechanism sections 120a and 120b have the distribution algorithm tables in which control information for trunking is registered to send data to or receive data from client computers 300, 300a, 300b, and 300c by using the NICs 131a and 132a and the NICs 131b and 132b respectively.

FIG. 14 shows an example of the data structure of the distribution algorithm table used in the system according to the second embodiment of the present invention. The data structure of the distribution algorithm table 121a is the same as that of the distribution algorithm table 121 in the first embodiment shown in FIG. 9, except a Source NIC column.

Of the NICs 131a and 132a and the NICs 131b and 132b mounted on the server computers 100a and 100b, respectively, the MAC address of an NIC used for transferring data on the basis of a corresponding application is set in the Source NIC column. In addition, the name of a computer on which the NIC is mounted is set in parentheses in the Source NIC column. The name of a computer on which the NIC is mounted is the name (identifier) of a server computer on which the NIC is mounted.

When the WWW server 110a sends data to or receives data from the four client computers 300, 300a, 300b, and 300c in such an environment with a load distributed by round robin scheduling, the following process is performed between the server computers 100a and 100b at the time of starting the system.

Figure 15:
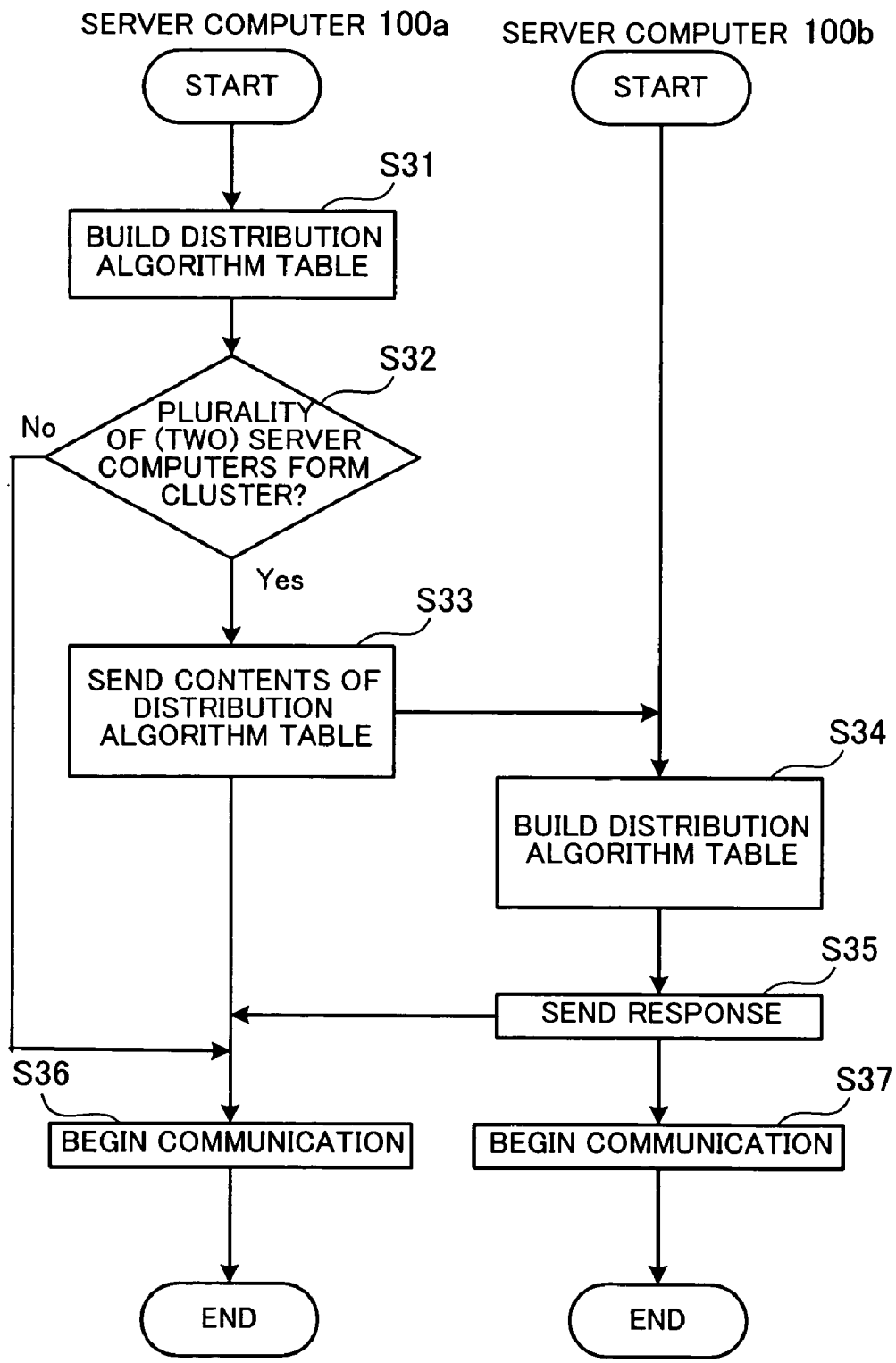
FIG. 15 is a flow chart showing the procedure of a process performed at system start time in the second embodiment of the present invention.

FIG. 15 is a flow chart showing the procedure of a process performed at system start time in the second embodiment of the present invention. The process shown in FIG. 15 will now be described in order of step number.

[Step S31] The trunking mechanism section 120a included in the server computer 100a builds the distribution algorithm table 121a. This is the same with the first embodiment. The trunking mechanism section 120a delivers a distribution algorithm notification packet 20 the packet type of which is "broadcast." The MAC addresses of the NICs 131a and 132a and the NICs 131b and 132b mounted on the server computers 100a and 100b, respectively, are included in the distribution algorithm notification packet 20 as source NICs. In addition, the node name of a server computer on which each NIC is mounted is added to these MAC addresses.

[Step S32] The trunking mechanism section 120a determines whether the server computer 100a and another cooperative server computer form a cluster. If a plurality of server computers including the server computer 100a form a cluster, then step S33 is performed. If the server computer 100a is not included in a cluster, then step S36 is performed.

[Step S33] The trunking mechanism section 120a sends the contents of the distribution algorithm table 121a to the server computer 100b by using the dedicated inter-system communication path 40.

[Step S34] The trunking mechanism section 120b included in the server computer 100b builds the distribution algorithm table 121b on the basis of the contents of the distribution algorithm table 121a it received from the server computer 100a.

[Step S35] The trunking mechanism section 120b sends a response to the server computer 100a.

[Step S36] The server computer 100a begins to communicate with the client computers 300, 300a, 300b, and 300c.

[Step S37] Similarly, the server computer 100b begins to communicate with the client computers 300, 300a, 300b, and 300c.

As stated above, by building the same distribution algorithm table at system start time, trunking can be performed by a cluster system using the server computers 100a and 100b. The following data transfer is performed as a result of load distribution by trunking.

Figure 16:
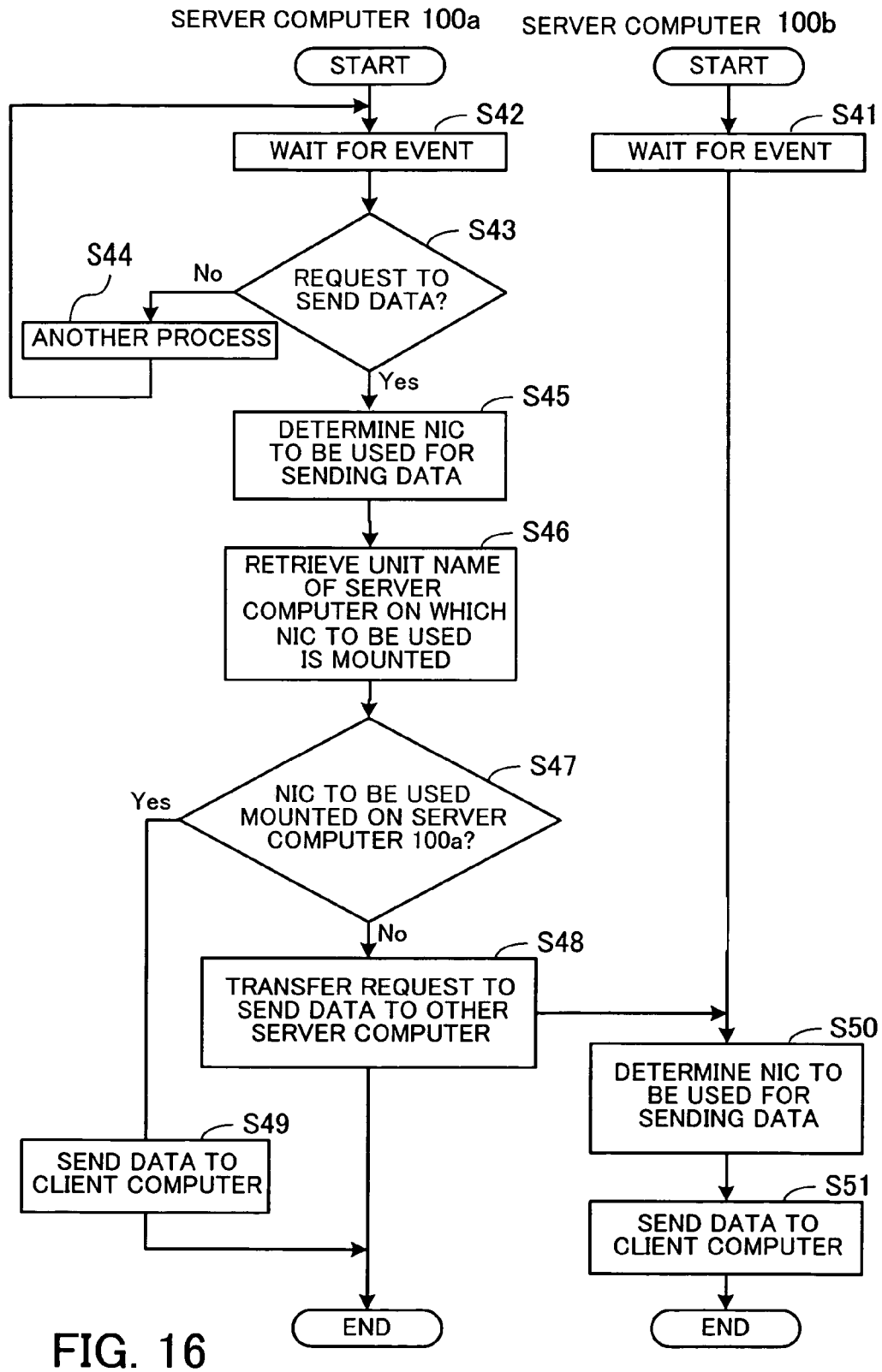
FIG. 16 is a flow chart showing the procedure for sending data in the case of using a plurality of server computers.

FIG. 16 is a flow chart showing the procedure for sending data in the case of using a plurality of server computers. The process shown in FIG. 16 will now be described in order of step number.

[Step S41] The trunking mechanism section 120b included in the server computer 100b remains in the state in which it waits for an event from the server computer 100a.

[Step S42] The trunking mechanism section 120a included in the server computer 100a remains in the state in which it waits for an event from the WWW server 110a.

[Step S43] When some event occurs, the trunking mechanism section 120a determines whether the event is a request from the WWW server 110a to send data. If the event is a request from the WWW server 110a to send data, then step S45 is performed. If the event is not a request from the WWW server 110a to send data, then step S44 is performed.

[Step S44] The trunking mechanism section 120a performs a process other than sending data which corresponds to the event. Step S42 is then performed, that is to say, the trunking mechanism section 120a waits for an event again.

[Step S45] The trunking mechanism section 120a searches the distribution algorithm table 121a and determines an NIC to be used for sending the data. To be concrete, the trunking mechanism section 120a refers to the distribution algorithm table 121a and determines a distribution algorithm from a destination, an application name, and the like. In accordance with the distribution algorithm determined, the trunking mechanism section 120a then determines an NIC to be used for sending the data.

[Step S46] The trunking mechanism section 120a retrieves the unit name of a server computer on which the NIC to be used for sending the data is mounted from the distribution algorithm table 121a.

[Step S47] The trunking mechanism section 120a determines whether the NIC to be used is mounted on the server computer 100a itself. If the NIC to be used is mounted on the server computer 100a, then step S49 is performed. If the NIC to be used is mounted on the other server computer, then step S48 is performed.

[Step S48] The trunking mechanism section 120a transfers the request from the WWW server 110a to send the data to the other server computer 100b by using the inter-system communication path 40. The process on the server computer 100a then terminates and step S50 is performed by the trunking mechanism section 120b included in the server computer 100b.

[Step S49] The trunking mechanism section 120a sends the data to a client computer via the NIC determined in step S45.

[Step S50] The trunking mechanism section 120b included in the server computer 100b searches its distribution algorithm table 121b and determines an NIC to be used for sending the data.

[Step S51] The trunking mechanism section 120b sends the data to a client computer via the NIC determined in step S50.

Figure 17:
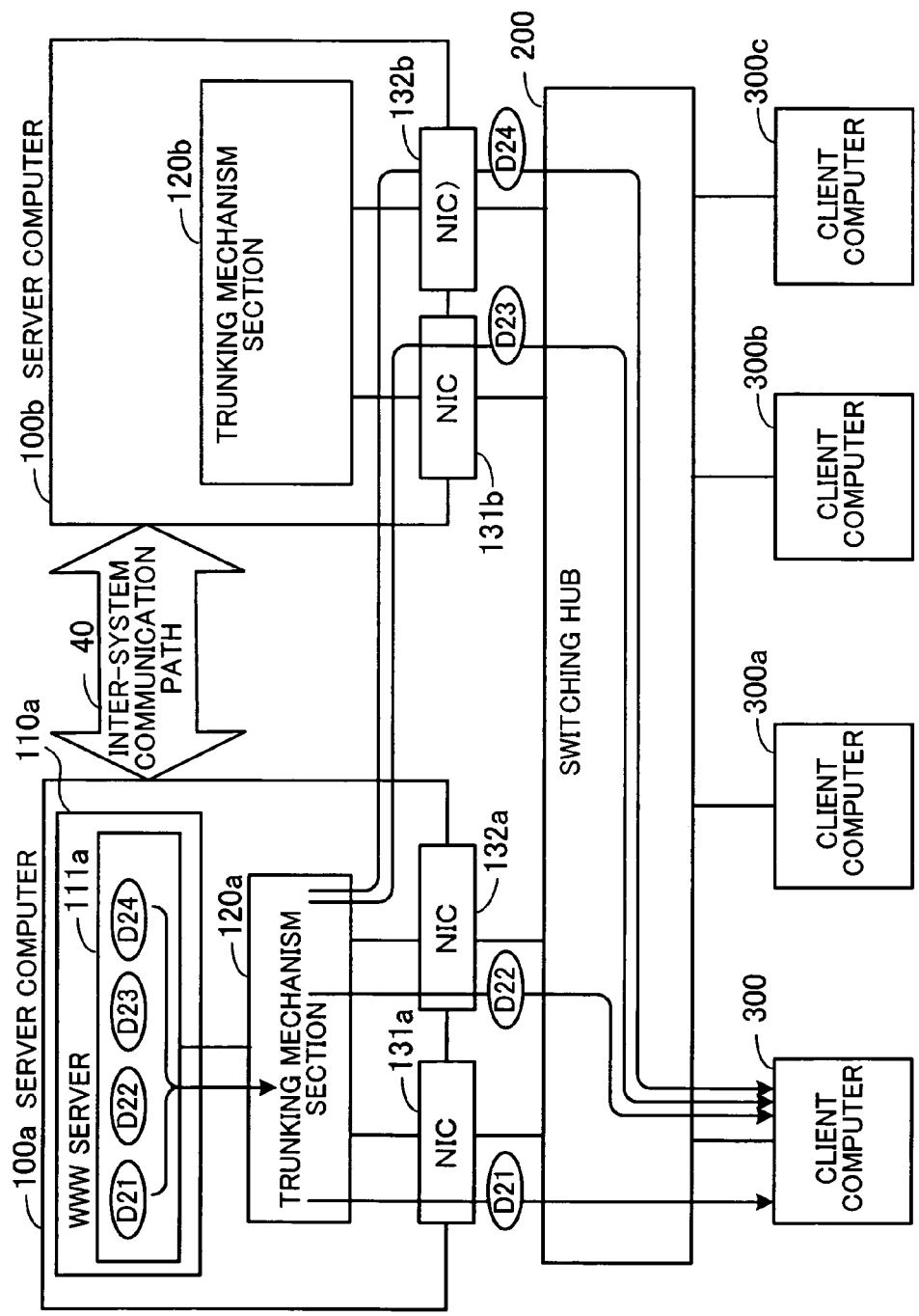
FIG. 17 shows how data is sent in the case of using the plurality of server computers.

FIG. 17 shows how data is sent in the case of using the plurality of server computers. When the WWW server 110a included in the server computer 100a passes send data 111a to the trunking mechanism section 120a, the trunking mechanism section 120a divides the send data 111a into plural pieces of data and assigns them to the NICs 131a and 132a and the NICs 131b and 132b. In this example, the send data 111a is divided into four pieces of data (data D21, data D22, data D23, and data D24).

The trunking mechanism section 120a assigns the send data 111a to the NICs 131a, 132a, 131b, and 132b in accordance with the round robin scheduling. As a result, the data D21 is sent to the client computer 300 via the NIC 131a. The data D22 is sent to the client computer 300 via the NIC 132a. The data D23 is sent to the trunking mechanism section 120b included in the server computer 100b via the inter-system communication path 40, is assigned to the NIC 131b by the trunking mechanism section 120b, and is sent to the client computer 300. The data D24 is sent to the trunking mechanism section 120b included in the server computer 100b via the inter-system communication path 40, is assigned to the NIC 132b by the trunking mechanism section 120b, and is sent to the client computer 300.

After that, the NICs 131a, 132a, 131b, and 132b are used again in that order to transfer data.

As stated above, the send data 111a to be sent from the server computers 100a and 100b to the client computers 300, 300a, 300b, and 300c is passed to the switching hub 200 with the load distributed, and is then passed to the client computers 300, 300a, 300b, and 300c.

On the other hand, when data is sent from the client computer 300, 300a, 300b, or 300c to the server computer 100a with the load distributed, the client computer 300, 300a, 300b, or 300c determines a load distribution method on the basis of a distribution algorithm notification packet sent from the server computer 100a before the beginning of communication. As a result, the data to be sent from the client computer 300, 300a, 300b, or 300c to the server computer 100a is divided and is sent to the NICs 131a, 132a, 131b, and 132b. In this case, data sent to the NICs 131b and 132b is passed to the WWW server 110a by the trunking mechanism section 120b via the inter-system communication path 40.

As stated above, the contents of the distribution algorithm table 121a are the same as those of the distribution algorithm table 121b, so a trunking process can be performed by using the server computers 100a and 100b. As a result, regardless of the hardware specifications of the server computer 100a used (the upper limit of the number of NICs which can be mounted on the server computer 100a used), trunking can be actualized by increasing the number of NICs used.

Third Embodiment

A third embodiment of the present invention will now be described. In the third embodiment, an NIC can be added or removed without stopping the operation of a system.

Figure 18:
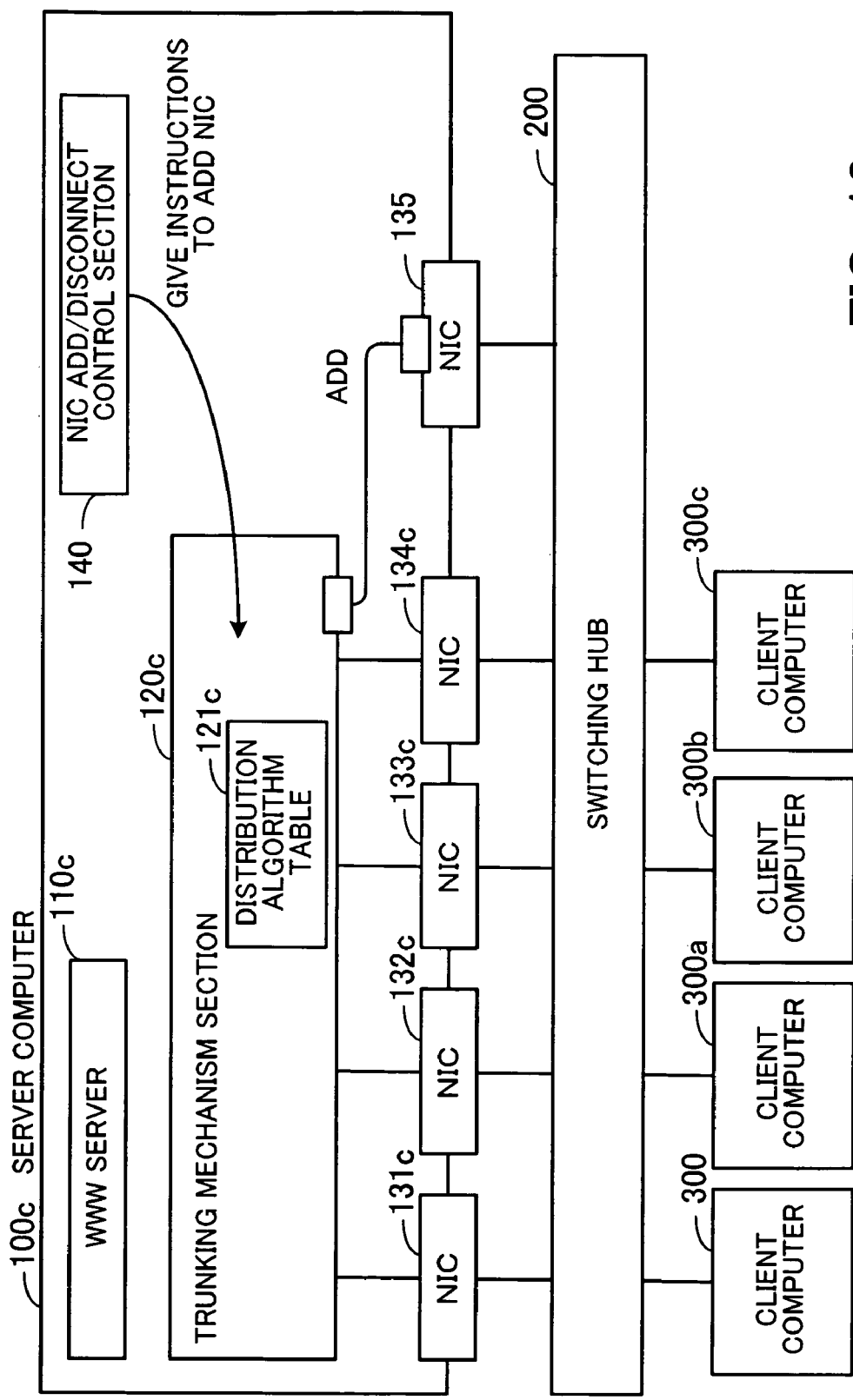
FIG. 18 is a view for describing the principle of adding one NIC.

FIG. 18 is a view for describing the principle of adding one NIC. A server computer 100c includes a WWW server 110c, a trunking mechanism section 120c, NICs 131c, 132c, 133c, 134c, and 135, and an NIC add/disconnect control section 140. The trunking mechanism section 120c includes a distribution algorithm table 121c. The NIC 135 is newly added.

An administrator of the server computer 100c connects the mounted spare NIC 135 to a switching hub 200 by a LAN cable. Trunking is not set in the switching hub 200. Accordingly, after the NIC 135 is connected to the switching hub 200, the NIC 135 can immediately be used for communication without resetting the switching hub 200. In other words, if a switching hub which can accommodate trunking is used, communication using an NIC which has already been connected to the switching hub must be stopped for a while to change a set value.

The server computer 100c must add the NIC 135 newly as the one for trunking. The NIC add/disconnect control section 140 included in the server computer 100c automatically recognizes the addition of the NIC 135 and registers information corresponding to the addition of the NIC 135 in the distribution algorithm table 121c. The distribution algorithm table 121c may be updated in accordance with instructions from an application or an operator before the NIC add/disconnect control section 140 automatically recognizes the addition of the NIC 135.

To be concrete, if the NIC add/disconnect control section 140 adds the NIC 135, the NIC add/disconnect control section 140 informs the trunking mechanism section 120c about the addition of the NIC 135 by using inter-program communication. The trunking mechanism section 120c which was informed about the addition of the NIC 135 sets the NIC 135 to be added in the distribution algorithm table 121c as a source NIC. At this time the trunking mechanism section 120c informs client computers 300, 300a, 300b, and 300c about the addition of the NIC 135 by a distribution algorithm notification packet. The trunking mechanism section 120c then performs load distribution at data sending time by using the NIC 135 as well as the NICs 131c, 132c, 133c, and 134c.

The client computers 300, 300a, 300b, and 300c are informed about the addition of the NIC 135 by the distribution algorithm notification packet and distribution algorithm tables on the client computers 300, 300a, 300b, and 300c are updated in accordance with the contents of the notification. Therefore, when data is sent from the client computer 300, 300a, 300b, or 300c to the server computer 100c, load distribution is performed in accordance with the updated distribution algorithm table by using the NIC 135 as well as the NICs 131c, 132c, 133c, and 134c.

The procedure for updating a distribution algorithm table at the time of adding an NIC will now be described with a process performed between the server computer 100c and the client computer 300 as an example.

Figure 19:
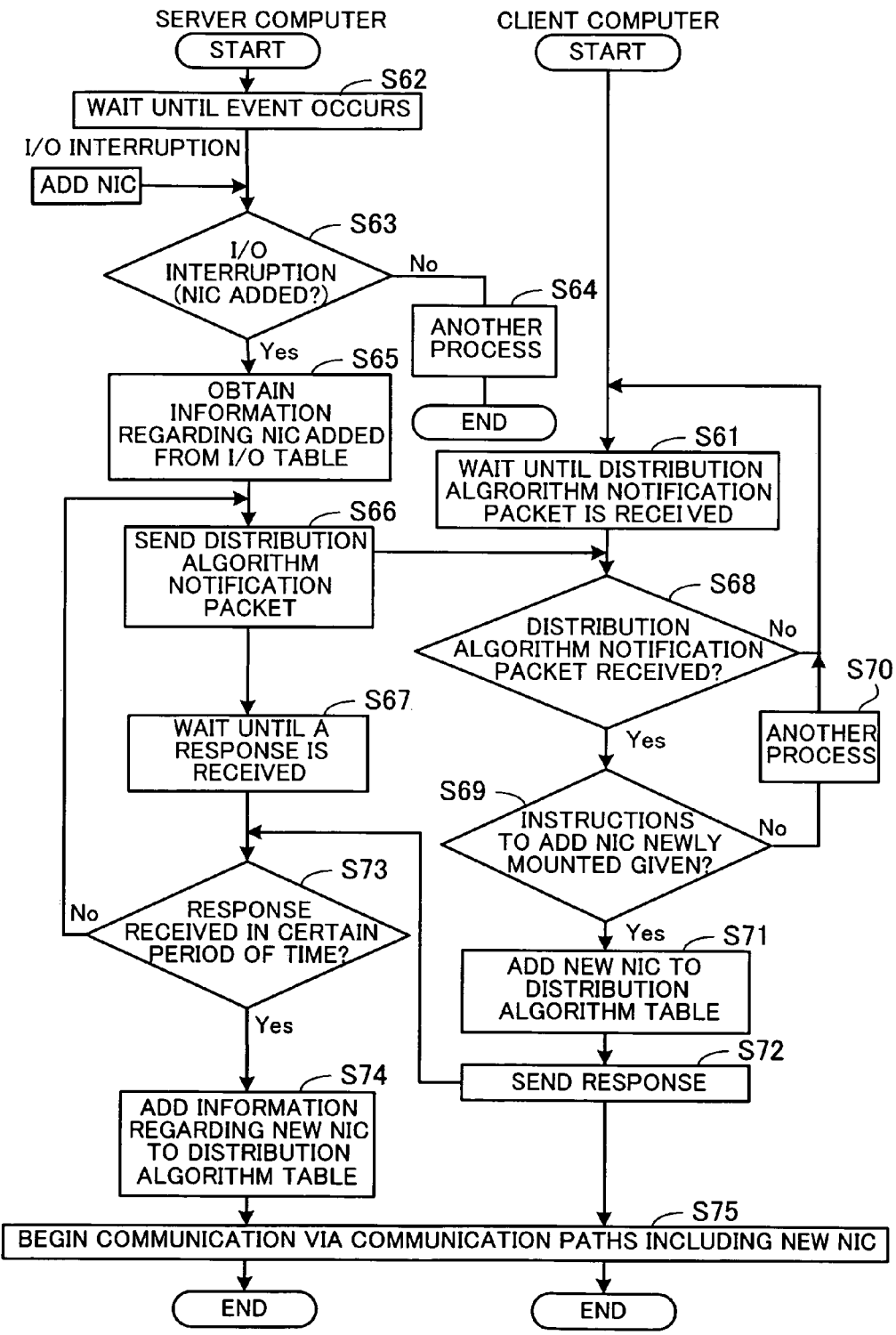
FIG. 19 is a flow chart showing the procedure for updating a distribution algorithm table at the time of adding an NIC.

FIG. 19 is a flow chart showing the procedure for updating a distribution algorithm table at the time of adding an NIC. The process shown in FIG. 19 will now be described in order of step number.

[Step S61] A trunking mechanism section 320 included in the client computer 300 waits until it receives a distribution algorithm notification packet.

[Step S62] The NIC add/disconnect control section 140 included in the server computer 100c waits until an event occurs.

When the NIC 135 is added, an I/O interrupt occurs.

[Step S63] The NIC add/disconnect control section 140 determines the source of the I/O interrupt. If the source of the I/O interrupt is the addition of an NIC, then step S65 is performed. If the source of the I/O interrupt is not the addition of an NIC, then step S64 is performed.

[Step S64] The NIC add/disconnect control section 140 performs a process corresponding to the I/O interrupt and then terminates the process.

[Step S65] The NIC add/disconnect control section 140 obtains information regarding the NIC 135 added from an I/O table. The I/O table is a data table which is managed by an OS and in which information corresponding to the I/O interrupt is defined. The NIC add/disconnect control section 140 gives the trunking mechanism section 120c instructions to add the NIC 135.

[Step S66] The trunking mechanism section 120c generates a distribution algorithm notification packet the packet type of which is "addition" and sends it to the client computer 300. By doing so, the client computer 300 is informed about the information regarding the NIC 135 added.

[Step S67] The trunking mechanism section 120c waits until it receives a response.

[Step S68] The trunking mechanism section 320 included in the client computer 300 determines whether it has received the distribution algorithm notification packet. If the trunking mechanism section 320 has received the distribution algorithm notification packet, then step S69 is performed. If the trunking mechanism section 320 has not received the distribution algorithm notification packet, then step S61 is performed. Accordingly, the trunking mechanism section 320 continues to wait until it receives the distribution algorithm notification packet.

[Step S69] The trunking mechanism section 320 determines whether instructions to add an NIC newly mounted are given by the distribution algorithm notification packet. In this case, determination can be made on the basis of whether its packet type is "addition." If instructions to add an NIC newly mounted are given by the distribution algorithm notification packet, then step S71 is performed. If other instructions (instructions to remove an NIC, for example) are given by the distribution algorithm notification packet, then step S70 is performed.

[Step S70] The trunking mechanism section 320 performs a process (other than adding an NIC) designated by the distribution algorithm notification packet. Step S61 is then performed.

[Step S71] The trunking mechanism section 320 adds the new NIC designated by the distribution algorithm notification packet to its distribution algorithm table 321.

[Step S72] The trunking mechanism section 320 sends the server computer 100c a distribution algorithm notification packet the packet type of which is "response."

[Step S73] The trunking mechanism section 120c included in the server computer 100c determines whether it received a response in a certain period of time. If the trunking mechanism section 120c received a response in the certain period of time, then step S74 is performed. If the trunking mechanism section 120c did not receive a response in the certain period of time, then step S66 is performed.

[Step S74] The trunking mechanism section 120c checks the response and adds information regarding the NIC newly added to the distribution algorithm table 121c.

[Step S75] The trunking mechanism section 120c included in the server computer 100c and the trunking mechanism section 320 included in the client computer 300 begin data communication via communication paths including the NIC newly added.

The new NIC can be added in the above way. The above operation is performed independently of and concurrently with communication performed by an application on, for example, the WWW server 110c, so it has no influence on data on the other NICs 131c, 132c, 133c, and 134c sent or received up to then. In addition, there is no need to reset a set value in the switching hub 200 and to restart it. As a result, it is possible to dynamically widen a data transfer band without stopping communication.

During the operation of the system, an NIC can be removed in the same way that is used for adding an NIC.

Figure 20:
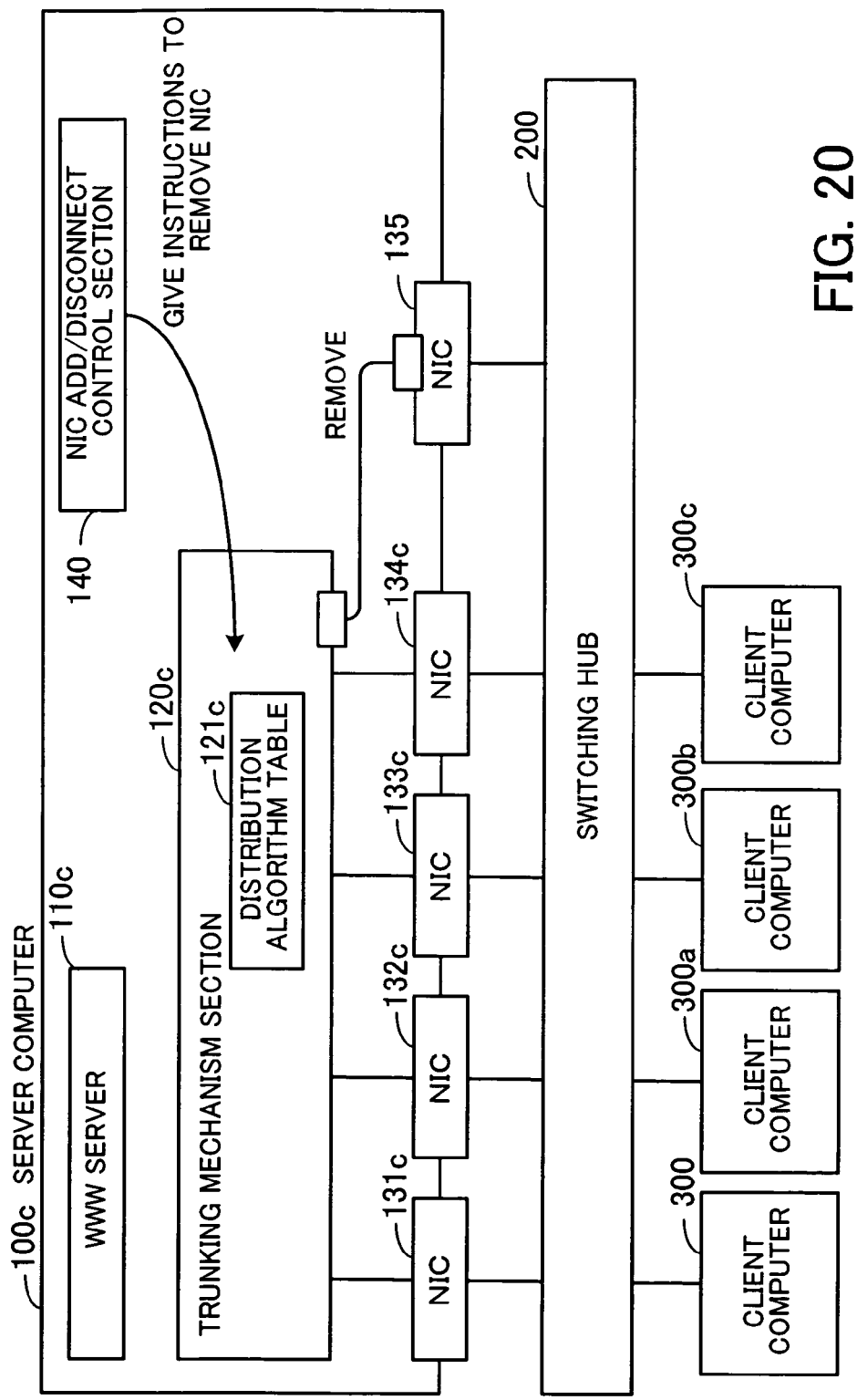
FIG. 20 is a view for describing the principle of removing one NIC.
Figure 21:
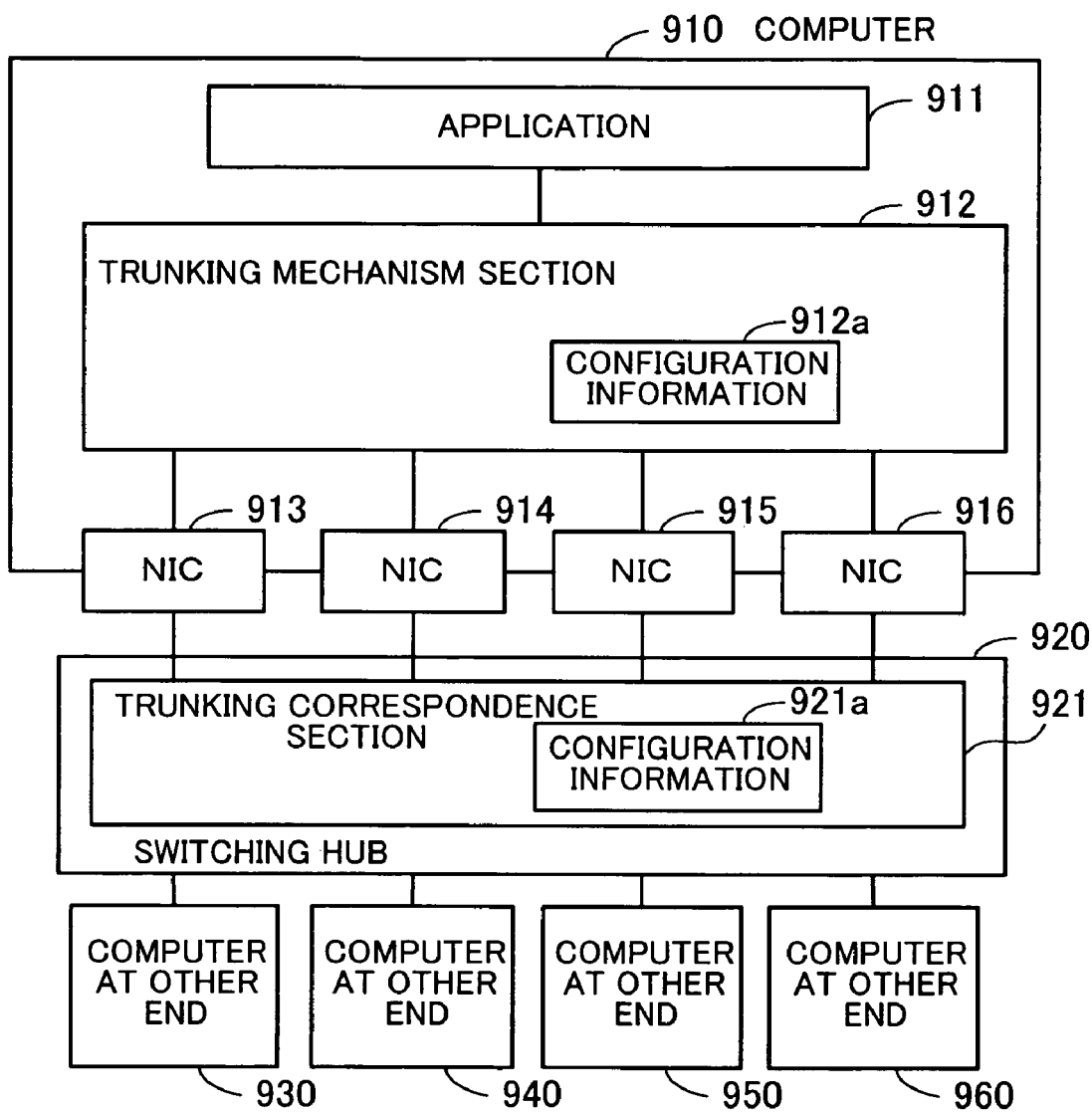
FIG. 21 shows an example of the configuration of a conventional trunking system.

FIG. 20 is a view for describing the principle of removing one NIC. When the NIC 135 is removed from the server computer 100c, the NIC add/disconnect control section 140 is informed about the disconnection of the NIC 135 by an I/O interrupt. The NIC add/disconnect control section 140 may be informed about the disconnection of the NIC 135 by an application on, for example, the server computer 100c or input provided by an operator's operation.

The NIC add/disconnect control section 140 informed about the disconnection of the NIC 135 updates internal system configuration information and informs the trunking mechanism section 120c about the disconnection of the NIC 135 by using inter-program communication. The trunking mechanism section 120c informed about the disconnection of the NIC 135 removes information regarding the NIC 135 from the distribution algorithm table 121c. By doing so, the NIC 135 is not used for trunking. As a result, when data is sent from the server computer 100c, load distribution is performed without using the NIC 135.

On the other hand, the trunking mechanism section 120c sends the client computers 300, 300a, 300b, and 300c a distribution algorithm notification packet the packet type of which is "removal" and in which the NIC 135 is not used for trunking. A trunking mechanism section included in each of the client computers 300, 300a, 300b, and 300c removes information regarding the NIC 135 from an internal distribution algorithm table. As a result, when data is sent from the client computer 300, 300a, 300b, or 300c to the server computer 100c, the NICs 131c, 132c, 133c, and 134c are used and the NIC 135 is not used.

Afterwards, to complete the removal of the NIC 135, the connecting cable is removed from a LAN port on the switching hub 200 to which the NIC 135 is connected.

The above operation is performed independently of and concurrently with communication performed by an application, so it has no influence on data on the other NICs sent or received up to then. In addition, there is no need to, for example, reset a set value in the switching hub 200 and restart it. As a result, it is possible to dynamically narrow a data transfer band without stopping communication.

As stated above, it is possible to add or remove an NIC without stopping the operation of the server computer 100c, so a bandwidth used for data communication between the server computer 100c and the switching hub 200 can be controlled easily. That is to say, if traffic becomes excessive and the bandwidth becomes insufficient, then an NIC should be added. By doing so, it is possible to widen the bandwidth without stopping the operation of the server computer 100c.

In order to actualize each of the above embodiments, a server program in which the contents of the functions the server computer should have are described and a client program in which the contents of the functions the client computers should have are described are provided. By executing the server program on a computer, the functions of the server computer in each of the above embodiments are actualized. In addition, by executing the client program on a computer, the functions of the client computers in each of the above embodiments are actualized.

Each of the above server program and client program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disk (DVD), a digital versatile disk random access memory (DVD-RAM), a compact disk read only memory (CD-ROM), a compact disk recordable (CD-R)/rewritable (CD-RW), or the like. A magneto-optical recording medium can be a magneto-optical disk (MO) or the like.

To place the server program and the client program on the market, portable record media, such as DVDs or CD-ROMs, on which they are recorded are sold. Alternatively, the client program is stored in advance on a hard disk in the server computer and is transferred from the server computer to each client computer via a network.

When the server computer executes the server program, it will store the server program, which is recorded on a portable record medium, on, for example, its hard disk. The server computer then reads the server program from its hard disk and performs processes in compliance with the server program. The server computer can also read the server program directly from a portable record medium and perform processes in compliance with the server program.

When each client computer executes the client program, it will store the client program, which is recorded on a portable record medium or which is transferred from the server computer, on, for example, its hard disk. The client computer then reads the client program from its hard disk and performs processes in compliance with the client program. Each client computer can also read the client program directly from a portable record medium and perform processes in compliance with the client program. Furthermore, each time the client program is transferred from the server computer, each client computer can perform processes in turn in compliance with the client program it received.

As has been described in the foregoing, in the present invention the computers at the other end are informed about the physical addresses of the plurality of communication interfaces and a distribution algorithm by a distribution algorithm notification packet. Each computer at the other end sends send data to the physical address of a communication interface determined in accordance with the distribution algorithm. As a result, even if a device for relaying packets has no trunking function, trunking can be performed by using a plurality of transmission lines.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium on which a data communication load distribution control program for distributing a communication load on transmission lines for a single computer on which a plurality of communication interfaces are mounted is recorded, the program making the single computer perform a process comprising:

generating a distribution algorithm notification packet including a plurality of different physical addresses to specify the plurality of communication interfaces mounted on the single computer and a distribution algorithm to be used by a computer at the other end to determine in what order the different physical addresses are selected as destination addresses of send data for the single computer; and sending the distribution algorithm notification packet from the single computer to the computer at the other end via a network, so as to cause the computer at the other end to send data to the single computer by using the different physical addresses in the order according to the distribution algorithm specified in the distribution algorithm notification packet.

2. The computer-readable, non-transitory medium on which the data communication load distribution control program is recorded, according to claim 1, wherein the distribution algorithm notification packet is broadcast at system start time.

3. The computer-readable, non-transitory medium on which the data communication load distribution control program is recorded, according to claim 1, wherein the distribution algorithm notification packet in which the distribution algorithm is designated is generated according to data communication applications.

4. The computer-readable, non-transitory medium on which the data communication load distribution control program is recorded, according to claim 1, wherein the distribution algorithm notification packet in which the distribution algorithm is designated is generated according to computers at the other end.

5. The computer-readable, non-transitory medium on which the data communication load distribution control program is recorded, according to claim 1, wherein the distribution algorithm notification packet in which a communication interface usable for communication is designated is generated according to data communication applications.

6. The computer-readable, non-transitory medium on which the data communication load distribution control program is recorded, according to claim 1, wherein the distribution algorithm notification packet in which a communication interface usable for communication is designated is generated according to computers at the other end.

7. The computer-readable, non-transitory medium on which the data communication load distribution control program is recorded, according to claim 1, wherein send data is distributed among the plurality of communication interfaces and is sent to the computer at the other end.

8. The computer-readable, non-transitory medium on which the data communication load distribution control program is recorded, according to claim 1, the distribution algorithm notification packet further includes physical addresses of a plurality of cooperative communication interfaces mounted on a cooperative computer that is connected to the single computer to perform a process in cooperation therewith.

9. The computer-readable, non-transitory medium on which the data communication load distribution control program is recorded, according to claim 8, wherein send data is distributed among the plurality of communication interfaces and the plurality of cooperative communication interfaces and is sent to the computer at the other end.

10. The computer-readable, non-transitory medium on which the data communication load distribution control program is recorded, according to claim 1, wherein when a new communication interface is added to the single computer:
   the distribution algorithm notification packet including a physical address of the added communication interface for informing that the added communication interface is also used for performing a distribution process is generated; and
   the distribution algorithm notification packet generated is sent to the computer at the other end.

11. The computer-readable, non-transitory medium on which the data communication load distribution control program is recorded, according to claim 1, wherein when a communication interface is removed from the single computer:
   the distribution algorithm notification packet for informing that the removed communication interface is not used for performing a distribution process is generated; and
   the distribution algorithm notification packet generated is sent to the computer at the other end.

12. A computer-readable, non-transitory medium on which a load distribution data sending program for distributing a communication load on transmission lines to a single computer at the other end on which a plurality of communication interfaces are mounted is recorded, the program making a computer perform a process comprising:
   receiving, from the single computer at the other end which is to receive data from the computer, a distribution algorithm notification packet including a plurality of different physical addresses to specify the plurality of communication interfaces mounted on the single computer at the other end and a distribution algorithm specifying in what order the different physical addresses are selected as destination addresses of send data for the single computer at the other end;
   storing the physical addresses of the plurality of communication interfaces and the distribution algorithm in a data table;
   selecting the different physical addresses in accordance with the order specified by the distribution algorithm; and
   transmitting the send data to the single computer at the other end by using the different physical addresses that are selected.

13. A data communication load distribution control method for distributing a communication load on transmission lines for a single computer on which a plurality of communication interfaces are mounted, the method comprising:
   generating a distribution algorithm notification packet including a plurality of different physical addresses to specify the plurality of communication interfaces mounted on the single computer and a distribution algorithm to be used by a computer at the other end to determine in what order the different physical addresses are selected as destination addresses of send data for the single computer; and
   sending the distribution algorithm notification packet from the single computer to the computer at the other end via a network, so as to cause the computer at the other end to send data to the single computer by using the different physical addresses in the order according to the distribution algorithm specified in the distribution algorithm notification packet.

14. A data communication load distribution method for distributing a communication load on transmission lines to a single computer at the other end on which a plurality of communication interfaces are mounted, the method comprising:
   receiving, from the single computer at the other end which is to receive data from the computer, a distribution algorithm notification packet including a plurality of different physical addresses to specify the plurality of communication interfaces mounted on the single computer at the other end and a distribution algorithm specifying in what order the different physical addresses are selected as destination addresses of send data for the single computer at the other end;
   storing the physical addresses of the plurality of communication interfaces and the distribution algorithm in a data table;
   selecting the different physical addresses in accordance with the order specified by the distribution algorithm; and
   transmitting the send data to the single computer at the other end by using the different physical addresses that are selected.

15. A single data communication load distribution control apparatus comprising:
   a plurality of communication interfaces configured to communicate with a computer at the other end of a network; and
   a processor to generate a distribution algorithm notification packet including a plurality of different physical addresses to specify the plurality of communication interfaces and a distribution algorithm to be used by the computer at the other end to determine in what order the different physical addresses are selected as destination addresses of send data for the single data communication load distribution control apparatus, and to send the distribution algorithm notification packet from the single data communication load distribution control apparatus to the computer at the other end, so as to cause the computer at the other end to send data to the single data communication load distribution control apparatus by using the different physical addresses in the order according to the distribution algorithm specified in the distribution algorithm notification packet.

16. A load distribution data sending apparatus for distributing a communication load on transmission lines to a single computer at the other end on which a plurality of communication interfaces are mounted, the apparatus comprising:
   a memory to store a plurality of different physical addresses specifying the plurality of communication interfaces mounted on the single computer at the other end and a distribution algorithm specifying in what order the different physical addresses are selected as destination addresses of send data for the single computer at the other end, wherein the physical addresses of the plurality of communication interfaces and the distribution algorithm are received as a distribution algorithm notification packet from the single computer at the other end which is to receive data from the load distribution data sending apparatus;

a processor to select the different physical addresses in accordance with the order specified by the distribution algorithm; and a network interface to transmit the send data to the single computer at the other end by using the different physical addresses that are selected.

* * * * *